(12) United States Patent
Sarver

(10) Patent No.: US 12,520,778 B2
(45) Date of Patent: Jan. 13, 2026

(54) FLOW VALVE SYSTEM WITH FLOW SENSOR, FLUID VALVE, AND RADIO MODULE

(71) Applicant: Larry C. Sarver, Mars, PA (US)

(72) Inventor: Larry C. Sarver, Mars, PA (US)

( * ) Notice: Subject to any disclaimer, the term of this patent is extended or adjusted under 35 U.S.C. 154(b) by 365 days.

(21) Appl. No.: 17/568,174

(22) Filed: Jan. 4, 2022

(65) Prior Publication Data

US 2022/0124993 A1 Apr. 28, 2022

Related U.S. Application Data

(63) Continuation-in-part of application No. 16/660,971, filed on Oct. 23, 2019, now Pat. No. 11,307,068.

(51) Int. Cl.
*A01G 25/16* (2006.01)
*F16K 37/00* (2006.01)

(52) U.S. Cl.
CPC .......... *A01G 25/165* (2013.01); *F16K 37/005* (2013.01)

(58) Field of Classification Search
None
See application file for complete search history.

(56) References Cited

U.S. PATENT DOCUMENTS

| | | | |
|---|---|---|---|
| 3,559,482 A | 2/1971 | Baker et al. | |
| 4,754,641 A * | 7/1988 | Orban | G01F 1/66 73/152.32 |
| 5,139,044 A * | 8/1992 | Otten | A01G 25/16 239/69 |
| 5,297,426 A | 3/1994 | Kane et al. | |
| 5,333,496 A | 8/1994 | Fenelon | |
| 5,479,812 A * | 1/1996 | Juntunen | G01F 1/50 73/1.34 |
| 5,835,884 A * | 11/1998 | Brown | G01F 1/667 702/45 |
| 5,861,561 A | 1/1999 | Van Cleve et al. | |
| 9,816,847 B2 * | 11/2017 | Sasaki | G01F 1/667 |
| 2009/0007654 A1 | 1/2009 | Niikawa et al. | |

(Continued)

OTHER PUBLICATIONS

Great Plains Industries, Inc., "Flomec QS200 Insertion Ultrasonic Flowmeter" Product Owner's Manual, 2018, pp. 1-24, Great Plains Industries, Inc., Wichita, Kansas.

(Continued)

*Primary Examiner* — Mark A Shabman
(74) *Attorney, Agent, or Firm* — The Webb Law Firm

(57) ABSTRACT

In a flow system, a flow sensor conducts fluid between a source and a distributor. The flow sensor outputs to a processor an electrical signal related to a velocity or volume of fluid flowing by, proximate to, or through the flow sensor. A fluid valve is connected to conduct a fluid between the flow sensor and the fluid distributor The processor determines, based on the electrical signal: the volume of fluid flowing by, proximate to, or through the flow sensor; and a second electrical signal, and outputs the second electrical signal to an irrigation controller. The processor includes a radio for wirelessly communicating the determined volume to a remote server via a smart device that includes a first radio for receiving the determined volume from the processor and a second radio for uploaded or transmitting the determined volume received by the smart device to the remote server.

6 Claims, 5 Drawing Sheets

(56) References Cited

U.S. PATENT DOCUMENTS

| | | | |
|---|---|---|---|
| 2009/0025472 A1 | 1/2009 | Garvin | |
| 2015/0129673 A1* | 5/2015 | Klinefelter | B05B 12/04 |
| | | | 239/7 |
| 2017/0322567 A1* | 11/2017 | Klein | G05D 7/0635 |
| 2018/0042189 A1* | 2/2018 | Klein | G06Q 50/06 |
| 2019/0297797 A1* | 10/2019 | Nickerson | A01G 25/165 |
| 2020/0386594 A1* | 12/2020 | Boer | G01F 15/005 |
| 2021/0333135 A1* | 10/2021 | Geerligs | G01F 15/066 |

OTHER PUBLICATIONS

Wikipedia, "Ultrasonic flow meter", https://en/wikipedia.org/wiki/Ultrasonic_flow_meter, Printed Sep. 8, 2019, pp. 1-3.

* cited by examiner

FLOW VALVE SYSTEM WITH FLOW SENSOR, FLUID VALVE, AND RADIO MODULE

CROSS-REFERENCE TO RELATED APPLICATION

This application is a continuation-in-part application of U.S. patent application Ser. No. 16/660,971, filed Oct. 23, 2019, the contents of which are incorporated herein in its entirety by reference.

BACKGROUND OF THE INVENTION

Field of the Invention

The present invention relates to a flow system, in particular, a flow control system for controlling irrigation of one or more desired areas.

Description of Related Art

Heretofore, flow sensors for measuring velocity of fluid flowing in pipes of irrigation systems were required to have an upstream flow diversion or flow obstruction (if provided) at least ten pipe diameters away from the flow sensor and/or a downstream flow diversion or flow obstruction (if provided) at least five pipe diameters from the flow sensor. As is known in the art, such flow sensors convert the measured fluid velocity into a corresponding electrical signal that can be used by a processor based controller, in a manner known in the art, to determine a volume of fluid flowing by or through the fluid sensor over a period of time.

As best understood, these distances (namely, at least ten pipe diameters upstream and at least five pipe diameters downstream) were needed to avoid turbulence in the fluid flowing by or through the flow sensor from adversely affecting the flow sensor's ability to provide an accurate indication of the fluid velocity measured by the flow sensor.

However, there is a desire in the industry to provide flow systems or flow control systems that are more compact than current state of the art flow systems.

SUMMARY OF THE INVENTION

Generally provided, in some non-limiting embodiments or examples, is a flow system (sometimes referred to as a "flow control system") that can, for example, be used as part of an irrigation system to control the distribution of water to an area.

Further non-limiting embodiments or examples are set forth in the following numbered clauses.

Clause 1: A flow system comprises a flow sensor connected via a plurality of fluid delivery pipes between a fluid source and a fluid distributor. The plurality of fluid delivery pipes includes a first pipe connected between the fluid source and an inlet to the flow sensor and a second pipe connected between an outlet of the flow sensor and the fluid distributor. Proximate the inlet of the flow sensor, the first pipe has a first interior diameter and, proximate the outlet of the flow sensor, the second pipe has a second interior diameter. The flow system comprises at least one of the following: a distance or length L1 between the inlet of the flow sensor and a flow diversion or a flow obstruction in the fluid path of the first pipe leading to the inlet of the flow sensor is less than ten times the first interior diameter; and/or a distance or length L2 between the outlet of the flow sensor and a flow diversion or a flow obstruction in the fluid path of the second pipe exiting the flow sensor is less than five times the second interior diameter.

Clause 2: The flow system of clause 1, wherein the first and second interior diameters can be the same or different.

Clause 3: The flow system of clause 1 or 2, wherein the flow diversion in at least one of the first pipe and the second pipe can include: a bend in said pipe, or a junction of three portions of said pipe.

Clause 4: The flow system of any one of clauses 1-3, wherein the bend can be a right angle.

Clause 5: The flow system of any one of clauses 1-4, wherein the junction can be T-shaped.

Clause 6: The flow system of any one of clauses 1-5, wherein the flow obstruction in the fluid path of at least one of the first pipe and the second pipe can be a fluid valve or another pipe having an interior diameter that is less than the respective first interior diameter and second interior diameter.

Clause 7: The flow system of any one of clauses 1-6, wherein the flow obstruction in the fluid path of the second pipe exiting the flow sensor can be a fluid valve having an inlet connected to the second pipe opposite the flow sensor and an outlet connected to the fluid distributor via a third pipe.

Clause 8: The flow system of any one of clauses 1-7, wherein the flow diversion in the fluid path of the second pipe can include a junction between an inlet of the second pipe that can be connected to an outlet of the flow sensor, a first outlet connected to an inlet of a fluid valve, and a second outlet. The third pipe can include a flow diversion in the fluid path of the third pipe in the form of a junction between a first inlet of the third pipe connected to an outlet of the fluid valve, a first outlet connected to the fluid distributor, and a second inlet. A shunt pipe can be connected in parallel with the fluid valve between the second outlet of the second pipe and the second inlet of the third pipe. A valve and a hydrogenerator can be mounted to the shunt pipe such that fluid flowing from the second pipe to the third pipe via the shunt pipe flows through the valve and the hydrogenerator, the hydrogenerator generating electrical power in response to the fluid flowing through the hydrogenerator.

Clause 9: The flow system of any one of clauses 1-8, wherein the flow sensor can be an ultrasonic flow sensor.

Clause 10: The flow system of any one of clauses 1-9, wherein the ultrasonic flow sensor can be a time transit flow meter.

Clause 11: The flow system of any one of clauses 1-10, wherein: the flow sensor can be programmed or configured to output to a controller an electrical signal related to a velocity or volume of fluid flowing by, proximate to, or through the flow sensor; and the controller can be programmed or configured to determine, based on the electrical signal, an actual volume of fluid flowing by, proximate to, or through the flow sensor.

Clause 12: The flow system of any one of clauses 1-11, wherein the controller can comprise a first processor programmed or configured: with a calibration value related to the distance or length L1, or the distance or length L2, or a type, style, or configuration of the flow diversion or the flow obstruction in the first pipe, or a type, style, or configuration of the flow diversion or the flow obstruction in the second pipe, or some combination thereof; and to determine, based on the electrical signal and the calibration value, a second electrical signal related to an actual velocity or volume of the fluid flowing by, proximate to, or through the flow sensor, wherein the electrical signal and the second electrical signal are different.

Clause 13: The flow system of any one of clauses 1-12, wherein the controller can comprise a second processor programmed or configured to determine, based on the second electrical signal, the actual volume of fluid flowing by, proximate to, or through the flow sensor.

Clause 14: The flow system of any one of clauses 1-13, wherein the second processor can be programmed or configured to control the open and closed state of a fluid valve based on the actual volume of fluid determined by the second processor to be flowing by, proximate to, or through the flow sensor.

Clause 15: The flow system of any one of clauses 1-14, wherein: the electrical signal can include data modulated thereon related to the velocity or volume of the fluid flowing by, proximate to, or through the flow sensor; the second electrical signal can include corrected data modulated thereon related to the actual velocity or volume of fluid flowing by, proximate to, or through the flow sensor; and the second processor can be programmed or configured to control the open and closed state of a fluid valve based on the corrected data, wherein the data modulated on the electrical signal can be inaccurate for the actual volume of fluid flowing by, proximate to, or through the flow sensor.

Clause 16: The flow system of any one of clauses 1-15, wherein the controller can be programmed or configured with an algorithm that includes a calibration value related to the distance or length L1; or the distance or length L2; or a type, style, or configuration of the first flow diversion or the first flow obstruction; or a type, style, or configuration of the second flow diversion or the second flow obstruction; or some combination thereof; and the controller can determine, based on said programmed calibration value, the volume of fluid flowing by, proximate to, or through the flow sensor.

Clause 17: A flow system comprises a flow sensor, a first pipe configured to transport fluid from an upstream fluid source to the flow sensor, and a second pipe configured to transport fluid from the flow sensor to a downstream fluid distributor. Proximate the flow sensor, the first pipe has a first interior diameter and the second pipe has a second interior diameter. The flow system comprises at least one of the following: a flow diversion or a flow obstruction positioned between the flow sensor and the upstream fluid source a distance or length L1 from the flow sensor that is less than ten times the first interior diameter of the first pipe; and a flow diversion or a flow obstruction positioned between the flow sensor and the downstream fluid distributor a distance or length L2 from the flow sensor that is less than five times the second interior diameter of the second pipe.

Clause 18: The flow system of clause 17, wherein: the flow sensor can be programmed or configured to output to a controller an electrical signal related to a velocity or volume of fluid flowing by, proximate to, or through the flow sensor; and the controller can be programmed or configured to determine, based on the electrical signal, an actual volume of fluid flowing by, proximate to, or through the flow sensor.

Clause 19: The flow system of clause 17 or 18, wherein the controller can comprise a first processor programmed or configured: with a calibration value related to the distance or length L1, or the distance or length L2, or a type, style, or configuration of the flow diversion or the flow obstruction in the first pipe, or a type, style, or configuration of the flow diversion or the flow obstruction in the second pipe, or some combination thereof; and to determine, based on the electrical signal and the calibration value, a second electrical signal related to an actual velocity or volume of the fluid flowing by, proximate to, or through the flow sensor, wherein the electrical signal and the second electrical signal are different.

Clause 20: The flow system of any one of clauses 17-19, wherein the controller can comprise a second processor programmed or configured to determine, based on the second electrical signal, the actual volume of fluid flowing by, proximate to, or through the flow sensor.

Clause 21: The flow system of any one of clauses 17-20, wherein the second processor can be programmed or configured to control the open and closed state of a fluid valve based on the actual volume of fluid determined by the second processor to be flowing by, proximate to, or through the flow sensor.

Clause 22: The flow system of any one of clauses 17-21, wherein: the electrical signal can include data modulated thereon related to the velocity or volume of the fluid flowing by, proximate to, or through the flow sensor; the second electrical signal can include corrected data modulated thereon related to the actual velocity or volume of fluid flowing by, proximate to, or through the flow sensor; and the second processor can be programmed or configured to control the open and closed state of a fluid valve based on the corrected data, wherein the data modulated on the electrical signal may be inaccurate for the actual volume of fluid flowing by, proximate to, or through the flow sensor.

Clause 23: The flow system of any one of clauses 17-22, wherein the controller can be programmed or configured with an algorithm that includes a calibration value related to the distance or length L1; the distance or length L2; or a type, style, or configuration of the first flow diversion or the first flow obstruction; or a type, style, or configuration of the second flow diversion or the second flow obstruction; or some combination thereof; and the controller can determine, based on said programmed calibration value, the volume of fluid flowing by, proximate to, or through the flow sensor.

Clause 24: The flow system of any one of clauses 17-23, wherein the type, style, or configuration of at least one of the first flow diversion or the second flow diversion can be a bend or a junction.

Clause 25: The flow system of any one of clauses 17-24, wherein the bend can be a right angle and/or the junction can be T-shaped.

Clause 26: The flow system of any one of clauses 17-25, wherein the type, style, or configuration of at least one of the first flow obstruction and the second flow obstruction can be a valve or another pipe having an interior diameter that can be less than the respective first interior diameter of the first pipe and the second interior diameter of the second pipe.

Clause 27: The flow system of any one of clauses 17-26, wherein the first interior diameter and the second interior diameter can be the same or different.

Clause 28: A flow system comprises a flow sensor connected to conduct a fluid between a fluid source and a fluid distributor, said flow sensor programmed or configured to output to a processor an electrical signal related to a velocity or volume of fluid flowing by, proximate to, or through the flow sensor; and at least one fluid valve connected to conduct a fluid between the flow sensor and the fluid distributor, wherein: the processor is programmed or configured to determine, based on the electrical signal, the volume of fluid flowing by, proximate to, or through the flow sensor, to determine a second electrical signal based on the electrical signal, and to output the second electrical signal to an irrigation controller; and the processor includes a radio that is operative for wirelessly communicating the determined volume to a remote server.

Clause 29: The flow system of clause 28, wherein the volume of fluid determined by the processor from the electrical signal can be an actual volume of fluid flowing by, proximate to, or through the flow sensor.

Clause 30: The flow system of clause 28 or 29, can further include an application running on a user smart device that causes the smart device to receive the determined volume wirelessly communicated via the radio of the processor and to communicate the determined volume to an application running on the remote server.

Clause 31: The flow system of any one of clauses 28-30, wherein the determined volume can be communicated to the application running on the remote server via a wireless communication channel, or a wired communication channel, or a combination of a wired and a wireless communication channel.

Clause 32: The flow system of any one of clauses 28-31, wherein: the processor can be programmed or configured to cause the radio to output a scanning signal; in response to a first radio transceiver of the smart device detecting the scanning signal, a wireless link can be formed between the first radio transceiver of the smart device and the radio of the processor; and the determined volume can be wirelessly communicated to the smart device via the wireless link.

Clause 33: The flow system of any one of clauses 28-32, wherein, following the determined volume being wirelessly communicated to the smart device via the wireless link, the wireless link can be terminated.

Clause 34: The flow system of any one of clauses 28-33, wherein the application running on the remote server can be programmed or configured to cause the determined volume to be provided to an application running on a computing device.

Clause 35: The flow system of any one of clauses 28-34, further including the processor can be programmed or configured with a software calendar that includes at least one of a volume limit or a blackout period. In response to the processor determining from the determined volume over a first period of time that the volume limit for said first period of time is reached, the processor can control the fluid valve to restrict, prevent, or stop fluid flowing through the fluid valve until the start of a second, ensuing, or following period of time. During the blackout period, the processor can restrict, prevent, or stop fluid flowing through the fluid valve regardless of the programming of the irrigation controller.

Clause 36: The flow system of any one of clauses 28-35, wherein each period of time can be one or more days, one or more weeks, one or more months, or one or more years.

Clause 37: The flow system of any one of clauses 28-36, further including the processor can be programmed or configured to determine that the determined volume passing by, proximate to, or through flow sensor during a period when fluid is not to be provided to the fluid distributor is greater than a predetermined volume value and, in response, to take least one of the following actions: close the fluid valve, or output an alarm.

Clause 38: The flow system of any one of clauses 28-37, further including the processor can be programmed or configured to determine that the determined volume passing by, proximate to, or through the flow sensor during a period when fluid is to be provided to the fluid distributor is greater than a predetermined maximum volume value and, in response, to take least one of the following actions: close the fluid valve, or output an alarm.

Clause 39: A method of operating the flow system of any one of clauses 28-38, comprising: (a) causing the radio of the processor to output a scanning signal; (b) upon a smart device including a first radio moving into radio communication range of the scanning signal, forming between the radio of the processor and the first radio of the smart device a wireless link; (c) following step (b), the processor uploading the determined volume to the smart device via the wireless link; (d) following step (c), the smart device uploading the determined volume uploaded to the smart device in step (c) to the remote server via a communication channel; and (e) following step (d), terminating the wireless link between the radio of the processor and the first radio of the smart device.

Clause 40: The method of clause 39, wherein the communication channel can be a wired communication channel, a wireless communication channel, or a combination of a wired and a wireless communication channel.

Clause 41: The method of clause 39 or 40, wherein the smart device can include a second radio that forms at least a portion of the communication channel wirelessly.

Clause 42: The method of any one of clauses 39-41, further including enforcing, by the processor, a volume limit or a blackout period based on a software calendar included with the processor, wherein: in response to the processor determining from the determined volume over a first period of time that the volume limit for said first period of time is reached, the processor controls the fluid valve to restrict, prevent, or stop fluid flowing through the fluid valve until the start of a second, ensuing or following period of time; and during the blackout period, the processor restricts, prevents, or stops fluid flowing through the fluid valve regardless of the programming of the processor.

Clause 43: A flow system comprising: a processor programmed or configured to determine a volume of fluid flowing by, proximate to, or through a flow sensor and to communicate to a smart device the determined volume and to communicate to an irrigation controller a signal used to determine the determined volume; the smart device running a smart device software application that configures the smart device to communicate with the processor and receive at the smart device the determined volume communicated by the processor; and a server running a server software application that configures the server to communicate with the smart device and receive at the server the determined volume received at the smart device.

Clause 44: The flow system of clause 43, wherein the determined volume is communicated from the processor to the smart device via a wireless link.

Clause 45: The flow system of clause 43 or 44, wherein the determined volume is communicated from the smart device to the server via a communication channel.

Clause 46: The flow system of any one of clauses 43-45, wherein the communication channel is a wired communication channel, a wireless communication channel, or a combination of wired and wireless communication channel.

Clause 47: The flow system of any one of clauses 43-46, wherein: the wireless link is formed using a first wireless technology standard; the communication channel is formed at least in part using a second wireless communication standard; or both.

BRIEF DESCRIPTION OF THE DRAWINGS

These and other features of the present invention will become more apparent from the following description wherein reference is made to the appended drawings wherein.

DESCRIPTION OF THE INVENTION

The following examples will be described with reference to the accompanying figures where like reference numbers correspond to like or functionally equivalent elements. It is to be understood that the specific example(s) illustrated in the attached drawings, and described in the following specification, are simply non-limiting embodiments or examples of the invention. Hence, the specific embodiments or examples disclosed herein are not to be construed as limiting.

Figure 1:
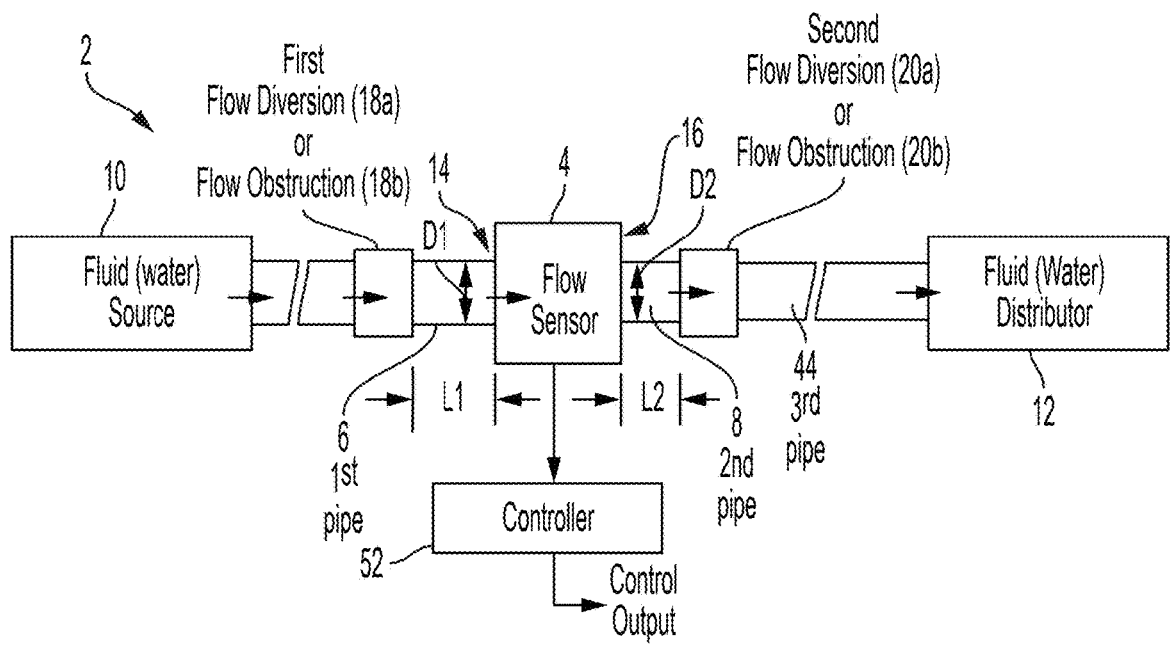
FIG. 1 is a schematic view of a non-limiting embodiment or example flow system according to the principles of the present invention.

With reference to FIG. 1, in some non-limiting embodiments or examples, a flow system 2 includes a flow sensor 4 connected via a plurality of fluid delivery pipes (6, 8) between a fluid source 10 and a fluid distributor 12. The fluid distributor 12 can include any suitable and/or desirable water distribution means, such as, without limitation, a sprinkler head or a drip irrigation pipe.

In some non-limiting embodiments or examples, the plurality of fluid delivery pipes can include a first pipe 6 connected between the fluid source 10 and an inlet 14 to flow sensor 4 and a second pipe 8 connected between an outlet 16 of flow sensor 4 and fluid distributor 12. Proximate the inlet 14 of flow sensor 4, first pipe 6 has a first interior diameter D1. Proximate the outlet 16 of flow sensor 4, second pipe 8 has a second interior diameter D2. In an example, the first and second interior diameters (D1, D2) can be the same or different.

In some non-limiting embodiments or examples, flow sensor 4 can be an ultrasonic flow sensor. The ultrasonic flow sensor can, for example, be a transit time flow sensor. However, the description of flow sensor 4 being an ultrasonic flow sensor, in particular, a transit time flow sensor, is not to be construed in a limiting sense.

The inventor has surprisingly discovered, contrary to the prior art known at the time of the present invention, that it is possible to successfully use in an irrigation system a flow sensor (e.g., an ultrasonic flow sensor and, in particular, a time transit ultrasonic flow sensor) that is positioned closer to flow diversion(s) and/or flow obstruction(s) than was previously thought possible to accurately measure a velocity of fluid flowing by, proximate, or through the flow sensor.

For example, in some non-limiting embodiments or examples, a distance or length L1 between inlet 14 of flow sensor 4 and a first flow diversion 18a or a first flow obstruction 18b in the fluid path of the first pipe 6 leading to inlet 14 of flow sensor 4 can be less than ten times the first interior diameter D1 of first pipe 6. Also or alternatively, in some non-limiting embodiments or examples, a distance or length L2 between outlet 16 of flow sensor 4 and a second flow diversion 20a or a second flow obstruction 20b in the fluid path of second pipe 8 exiting flow sensor 4 can be less than five times the second interior diameter D2 of second pipe 8. Herein, distance or length L1 is less than ten times the first interior diameter D1, and distance or length L2 is less than five times the second interior diameter D2.

Herein, terms such as "first", "second", "third", and the like are utilized for the purpose of description as an aid to distinguish one element or feature from another and are not to be construed in a limiting sense.

In some non-limiting embodiments or examples, flow system 2 can include first flow diversion 18a or first flow obstruction 18b within distance or length L1 of inlet 14 of flow sensor 4, but may not include a flow diversion 20a or flow obstruction 20b within distance or length L2 of outlet 16 of flow sensor 4. In another non-limiting embodiment or example, flow system 2 may include second flow diversion 20a or second flow obstruction 20b within distance or length L2 of outlet 16 of flow sensor 4, but may not include first flow diversion 18a or first flow obstruction 18b within distance or length L1 of input 14 of flow sensor 4. Accordingly, the description or illustration of inlet 14 of flow sensor 4 being within distance or length L1 of a flow diversion or flow obstruction and/or the outlet 16 of flow sensor 4 of being within distance or length L2 of a flow diversion or flow obstruction is not to be construed in a limiting sense since it is envisioned that flow system 2 may include a flow diversion or flow obstruction within distance or length L1 of input 14 of flow sensor 4, or a flow diversion of flow obstruction within distance or length L2 of outlet 16 of flow sensor 4, or both.

Figure 2:
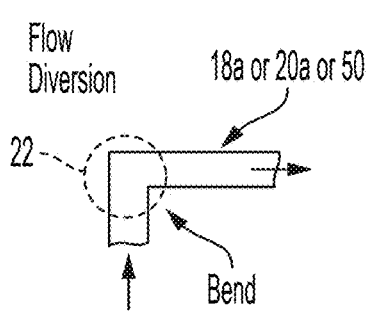
FIGS. 2-3 are examples of different types of flow diversions that can be used with the flow systems disclosed herein.
Figure 3:
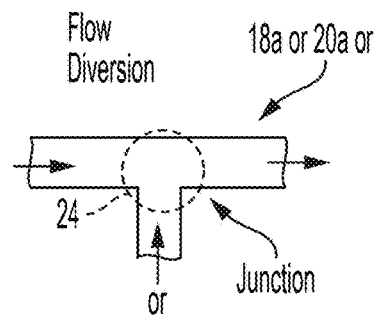

In some non-limiting embodiments or examples, first flow diversion 18a can include a bend 22 (FIG. 2) or a junction 24 (FIG. 3). Also or alternatively, in some non-limiting embodiments or examples, second flow diversion 20a can include a bend 22 or a junction 24. Also or alternatively, in some non-limiting embodiments or examples, a third junction (FIG. 7, described hereinafter) can include a bend 22 or junction 24. In an example, each bend 22 can be a right angle or any other desirable angle <180°. In another example, each junction 24 can be T-shaped having three ports. However, junctions having other shapes including three or more ports is envisioned.

Figure 4:
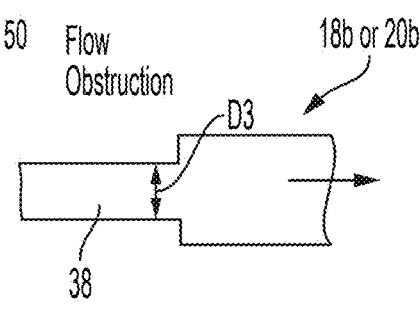
FIGS. 4-5 are examples of different types of flow obstructions that can be used with the flow systems disclosed herein.
Figure 5:
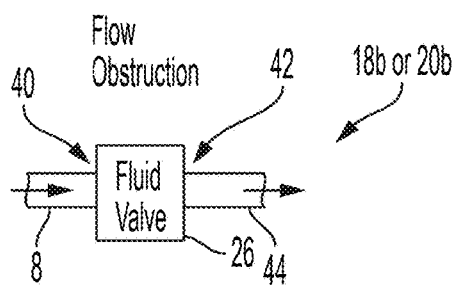

In some non-limiting embodiments or examples, first flow obstruction 18b can be a fluid valve 26 (FIG. 5) or another pipe 38 (FIG. 4) having an interior diameter D3 that is less than the first interior diameter D1. Also or alternatively, second flow obstruction 20b can be a fluid valve 26 or another pipe 38. In some non-limiting embodiments or examples, first flow obstruction 18b can be part of a pipe, e.g., without limitation, first pipe 6, or can be coupled to said pipe. In some non-limiting embodiments or examples, second flow obstruction 20b can be part of a pipe, e.g., without limitation, second pipe 8, or can be coupled to said pipe.

Figure 6:
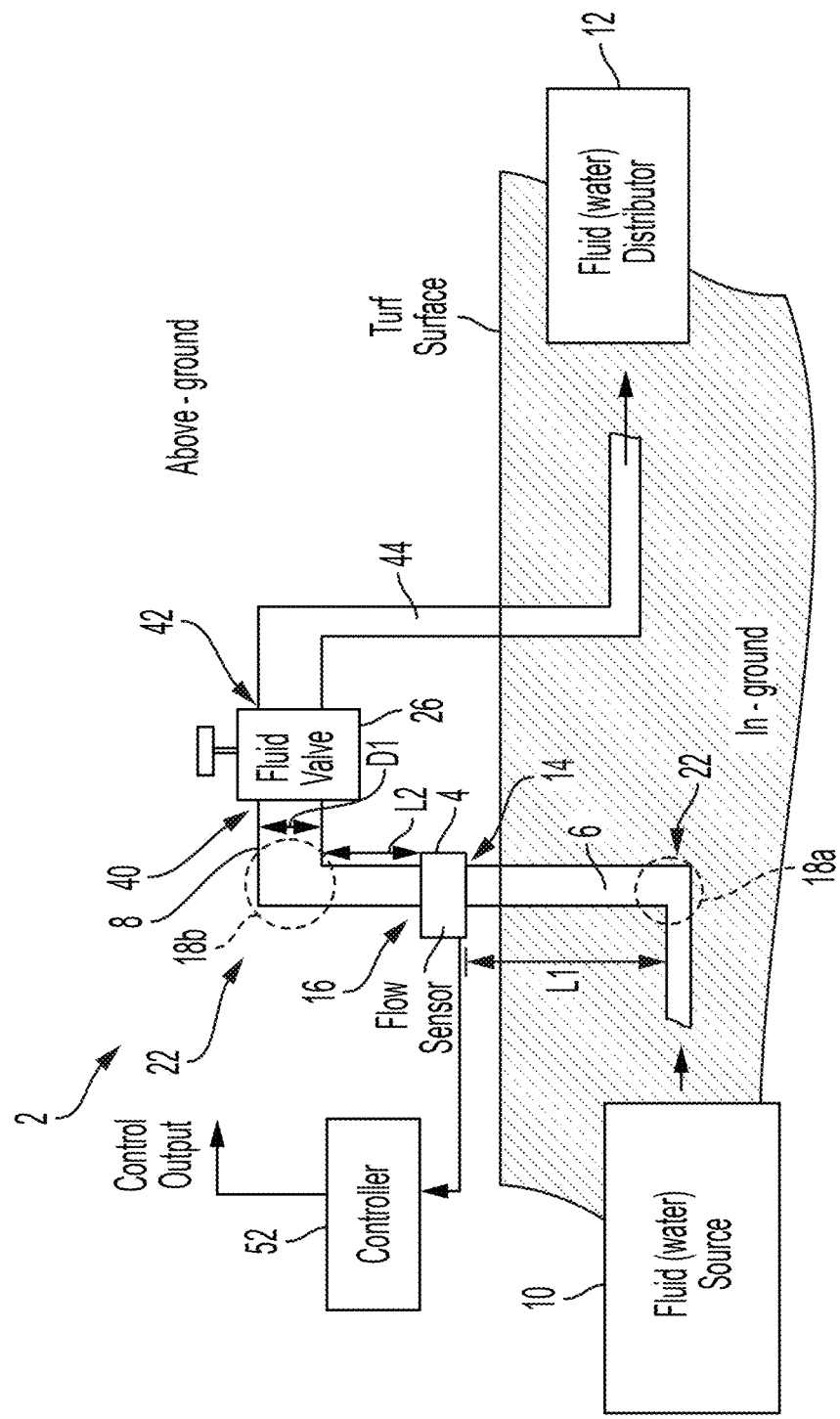
FIG. 6 is a schematic view of another non-limiting embodiment or example flow system according to the principles of the present invention.

With reference to FIG. 6 and with continuing reference to all previous figures, in some non-limiting embodiments or examples, first flow diversion 18a of first pipe 6 can be a bend 22 that is positioned length or distance L1 from inlet 14 of flow sensor 4 and second flow diversion 18b of second pipe 8 can be a bend 22 that is positioned distance or length L2 from outlet 16 of flow sensor 4. In this example, flow sensor 4, second pipe 8, a fluid valve 26 having an inlet 40 coupled to outlet 16 of flow sensor 4 via second pipe 8, a portion of first pipe 6, and a portion of third pipe 44 coupled to outlet 42 of fluid valve 26 are above-ground, while the remainder of first pipe 6 and third pipe 44 are in-ground. However, this is not to be construed in a limiting sense since it is envisioned that some or all of first pipe 6, flow sensor 2, second pipe 8, fluid valve 26, and/or third pipe 44 can be above-ground, in-ground, or some combination thereof.

Figure 7:
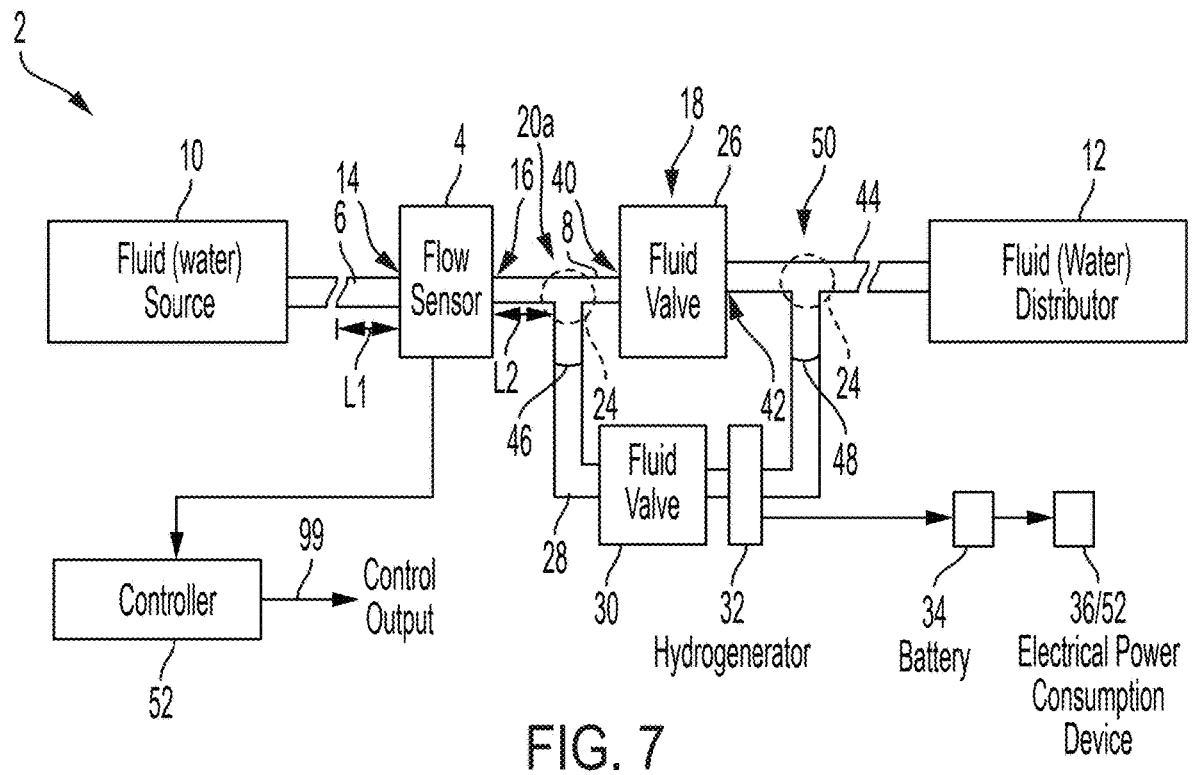
FIG. 7 is a schematic view of another non-limiting embodiment or example flow system according to the principles of the present invention.

With reference to FIG. 7 and with continuing reference to all previous figures, in some non-limiting embodiments or examples, second flow diversion 20*a* can include a junction 24, for example, a T-shaped junction, of second pipe 8 disposed between an inlet of second pipe 8 that is connected to outlet 16 of flow sensor 4, a first outlet of second pipe 8 connected to inlet 40 of a fluid valve 26, and a second outlet 46 of second pipe 8. In this example, a third flow diversion 50 can be provided that includes a junction 24 of third pipe 44 disposed between an inlet of third pipe 44 that is connected to outlet 42 of fluid valve 26, a first outlet of third pipe 44 connected (directly or indirectly) to fluid distributor 12, and a second inlet 48 of third pipe. In this example, the section of first pipe 6 leading to the inlet 14 of flow sensor 4 does not include a first flow diversion 18*a* or a first flow obstruction 18*b* within distance or length L1 of the inlet 14 of flow sensor 4. However, this is not to be construed in a limiting sense since it is envisioned that a first flow diversion 18*a* or a first flow obstruction 18*b* can, optionally, be positioned within distance or length L1 of the inlet 14 of flow sensor 4.

In some non-limiting embodiments or examples, a shunt pipe 28 can be connected in parallel with fluid valve 26 between second outlet 46 of second pipe 8 and second inlet 48 of third pipe 44. In an example, a fluid valve 30 and/or a hydrogenerator 32 can be mounted to shunt pipe 28 such that fluid flowing from second pipe 8 to third pipe 44 via shunt pipe 28 flows through fluid valve 30 and hydrogenerator 32. In an example, hydrogenerator 32 can generate electrical power in response to fluid flowing through hydrogenerator 32, which electrical power can be provided to a battery 34 for storage and use for powering an electrical power consumption device 36. In an example, the electrical power consumption device 36 can be a radio transmitter, a radio receiver, a radio transceiver, a processor based controller 52 that can be programmed or configured for controlling, via a control output 97 of controller 52, the open and closed states of one or more of fluid valves 26 and/or 30, and/or any other suitable and/or desirable electrical power consumption device that may not have access to electrical power from another source, such as a mains power source.

Heretofore, the prior art industry standard, practice, and understanding required that first pipe 6 have a straight run (without a diversion or an obstruction) of distance or length L1 that is at least ten times the first interior diameter D1 of first pipe 6 upstream of the inlet 14 of flow sensor 4, and a straight run (without a diversion or an obstruction) of distance or length L2 at least five times the second interior diameter D2 of second pipe 8 downstream of the outlet 16 of flow sensor 4. As best understood, these distances or lengths L1 and L2 avoid turbulence in the fluid, the velocity of which is being measured by flow sensor 4, which turbulence can adversely affect the measurement of the velocity (e.g., in feet per second) of fluid flowing by, proximate to, or through flow sensor 4. In contrast, the inventor has surprisingly discovered that it is possible to successfully use at least an ultrasonic flow sensor to measure fluid velocity when the inlet 14 of the ultrasonic flow sensor 4 is positioned a distance or length L1 that is less than ten times the interior diameter D1 of first pipe 6 to a flow diversion 18*a* or flow obstruction 18*b*. Similarly, the inventor has surprisingly discovered that it is also or alternatively possible to successfully use at least an ultrasonic flow sensor to measure fluid velocity when the outlet 16 of the ultrasonic flow sensor 4 is positioned a distance or length L2 that is less than five times the interior diameter D2 of the second pipe 8 to a flow diversion 20*a* or flow obstruction 20*b*.

In some non-limiting embodiments or examples, distance or length L1 can be less than five times, less than three times, or less than one time interior diameter D1. In some non-limiting embodiments or examples, distance or length L2 can be less than three times, or less than one time the interior diameter D2.

Because the distance or length L1 can be less than ten times interior diameter D1 and/or because the distance or length L2 can be less than five times interior diameter D2, the various example flow systems described herein can be made more compact and offer a wider variety of configuration options than was available in prior art flow systems.

In some non-limiting embodiments or examples, each example flow system described herein can include controller 52 that can be programmed or configured, in a manner known in the art, to process or measure, for each of one or more periods of time, the electrical signal output by flow sensor 4 related to the velocity or volume of the fluid flowing by, proximate to, or through the flow sensor 4, and to determine therefrom an actual volume of the fluid passing by, proximate to, or through the fluid sensor 4 during said period of time, e.g., integrate or sum the velocity or volume data modulated on the electrical signal with respect to the period of time. Based on the thus determined fluid volume, controller 52 can be programmed or configured to control the on/off state of one or more fluid valves thereby controlling the volume of fluid provided to an area being irrigated. In an example, controller 52 can include one or more processors and memory which can be programmed or configured to perform, at least, the various functions described herein. In an example, the electrical signal output by flow sensor 4 can be an analog signal or a digital signal that can include velocity or volume data modulated thereon and controller 52 can be programmed and/or configured to process said electrical signal in a manner known in the art to determine from said velocity or volume data modulated thereon a volume of fluid passing by, proximate to, or through the fluid sensor 4 during said period of time, e.g., integrate or sum the velocity or volume data with respect to the period of time.

In some non-limiting embodiments or examples, the electrical signal output by flow sensor 4 may be related to the velocity or volume of fluid flowing by, proximate to, or through the flow sensor 4. However, this is not to be construed in a limiting sense since it is envisioned that the electrical signal output by flow sensor 4 can be any suitable and/or desirable electrical signal, that can be processed by controller 52 to determine the actual volume of fluid flowing by, proximate to, or through the fluid sensor 4 during a period of time.

In some non-limiting embodiments or examples, controller 52 can be programmed or configured with an algorithm that determines, based on the data modulated on the electrical signal output by flow sensor 4, the actual volume of fluid passing by, proximate to, or through the flow sensor 4 during a period of time. However, it has been observed that the distance or length L1 between the inlet 14 of the flow sensor 4 and a flow diversion 18a or a flow obstruction 18b in the fluid path of the first pipe 6 leading to the inlet 14 of flow sensor 4; or the distance or length L2 between the outlet 16 of the flow sensor 4 and a flow diversion 20a or a flow obstruction 20b in the fluid path of the second pipe 8 exiting flow sensor 4; or the type, style, or configuration of the first flow diversion or the first flow obstruction; or the type, style, or configuration of the second flow diversion or the second flow obstruction; or some combination thereof can affect (in a manner discussed hereinafter) the data that is modulated on the electrical signal output by the flow sensor 4 and, hence, the accuracy of the algorithm to determine the volume of fluid flowing by, proximate to, or through the flow sensor 4 during a period of time. Accordingly, in an example, the algorithm can include at least one calibration value, the value of which can be selected and programmed, configured, or preset in said algorithm to account for distance or length L1, or distance or length L2, or the type, style, or configuration of the first flow diversion or the first flow obstruction, or the type, style, or configuration of the second flow diversion or the second flow obstruction, or some combination thereof.

For example, in a first example configuration of flow system 2, flow diversion 18a or flow obstruction 18b is present; flow diversion 20a or flow obstruction 20b is not present; and distance L1 is, for example, five times interior diameter D1, the algorithm can be programmed with a first (calibration) value for this configuration of flow system 2. In a second example configuration of flow system 2 similar to the first example configuration of flow system 2 with the exception that either distance L1 is different from five times interior diameter D1 (but continues to be less than ten times interior diameter D1), e.g., three or seven times interior diameter D1, or the type, style, or configuration of flow diversion 18a or flow obstruction 18b is changed, the algorithm can be programmed with a second (calibration) value for this configuration of flow system 2.

In a third example configuration of flow system 2, flow diversion 20a or flow obstruction 20b is present; flow diversion 18a or flow obstruction 18b is not present; and distance L2 is, for example, three times interior diameter D2, the algorithm can be programmed with a third (calibration) value for this configuration of flow system 2. In a fourth example configuration of flow system 2 similar to the third example flow system 2 with the exception that distance L2 is different from three times interior diameter D2 (but continues to be less than five times interior diameter D2), e.g., one or two times interior diameter D2, or the type, style, or configuration of flow diversion 20a or flow obstruction 20b is changed, the algorithm can be programmed with a fourth (calibration) value for this configuration of flow system 2.

In a fifth example configuration of flow system 2, flow diversion 20a or flow obstruction 20b is present; flow diversion 18a or flow obstruction 18b is present; distance L1 is, for example, five times interior diameter L1, and distance L2 is, for example, three times interior diameter D2, the algorithm can be programmed with a fifth (calibration) value for this configuration of flow system 2. In a sixth example configuration of flow system 2 similar to the fifth example flow system 2 with the exception that one or both of distance(s) L1 and/or L2 is changed, e.g. greater than or less than the previous distance, (but L1 remains less than ten times diameter D1 and L2 remains less than 5 times diameter D2) and/or the type, style, or configuration of flow diversion 18a and/or 20a and/or the type, style, or configuration of flow obstruction 20b and/or 18b is changed, the algorithm can be programmed with a sixth (calibration) value for this configuration of flow system 2.

In a seventh example configuration of flow system 2 that does not include flow diversion 18a or flow obstruction 18b within ten times diameter of D1 and does not include flow diversion 20a or flow obstruction 20b within five times diameter of D2, the algorithm can be programmed with a seventh (calibration) value for this configuration of flow system 2. The various example configurations of flow system 2 described herein are strictly for the purpose of illustration and are not to be construed as limiting the invention.

In general, it is envisioned that, for each unique configuration of flow system 2, the algorithm will be programmed, configured, or preset with a unique calibration value for said configuration. However, this is not to be construed as limiting since it is also possible that the same calibration value may be used for two or more unique configurations of flow system 2.

In some non-limiting embodiments or examples, it may be desirable to provide an integrated system that includes preconfigured flow system 2 together, or in combination with, controller 52 preprogrammed (or preset) with a predetermined calibration value for said preconfigured flow system 2 that enables the controller 52 to accurately determine the actual or true volume (±some tolerance) of fluid flowing by, proximate to, or through the flow sensor 4 during a period of time. For example, for any one of the configurations of the first-seventh example flow systems described above, controller 52 can be preprogrammed with the corresponding one of the first-seventh calibration values related to said configuration of the flow system.

In an example, the calibration value for a particular configuration of flow system 2 can be determined by empirical testing or experimentation, e.g., by comparing a measured velocity or volume of fluid that flows by, proximate to, or through the flow sensor 4 of said configuration of flow system 2 to a velocity or volume of fluid determined by controller 52 to flow by, proximate to, or through the flow sensor 4 of said configuration of flow system 2, and adjusting (as needed) the value of the calibration value until the measured velocity or volume and the velocity or volume of fluid determined by controller 52 are the same or within a predetermined tolerance. In this way, regardless of its configuration, e.g., described herein or not described herein, preconfigured flow system 2 can be provided together with controller 52 preprogrammed (or preset) with the calibration value determined for said configuration of flow system 2 for installation without the need to determine, in-the-field, the calibration value that enables controller 52 to accurately determine the volume of fluid flowing by, proximate to, or through the flow sensor 4 during a period of time and to program controller 52, in-the-field, with said calibration value.

Figure 8:
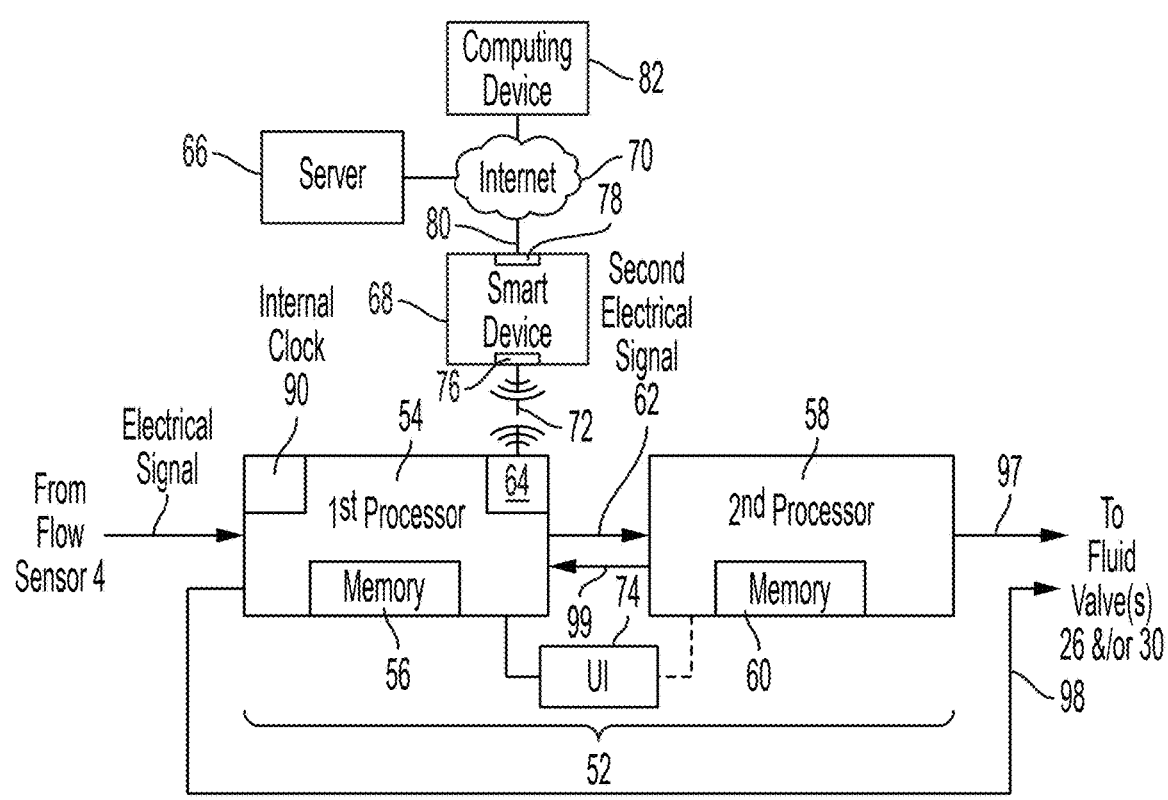
FIG. 8 is a block diagram of another example controller, including first and second processors or controllers, that can be used with any of the non-limiting embodiment or example flow systems described herein.

With reference to FIG. 8 and with continuing reference to FIGS. 1-7, in some non-limiting embodiments or examples, controller 52 can comprise a first processor or controller 54 and memory 56 that can be programmed or configured with an algorithm preset with a calibration value related to the distance or length L1, or the distance or length L2, or a type, style, or configuration of the first flow diversion or the first flow obstruction 18a or 18b, or a type, style, or configuration of the second flow diversion or the second flow obstruction 20a and 20b, or some combination thereof. In an example, when executed or run, the algorithm preset with said calibration value can determine and output, based on the data modulated on the electrical signal received by first processor or controller 54 from flow sensor 4 related to the volume of fluid flowing by, proximate to, or through the flow sensor, a second electrical signal related to the actual velocity or volume of fluid flowing by, proximate to, or through the flow sensor. In this example, the data modulated on the electrical signal output by the flow sensor 4 is inaccurate (for reasons discussed hereinafter) for the actual velocity of the volume of fluid flowing by, proximate to, or through the flow sensor 4. Herein, flow sensor 4 may sometimes be referred to as a flow meter.

In some non-limiting embodiments or examples, controller 52 may also comprise a second processor or controller 58 and related memory 60 programmed or configured to determine, based on the second electrical signal received from the first processor or controller 54 via a communication means 62, the actual volume of fluid flowing by, proximate to, or through the flow sensor during a period of time. In some non-limiting embodiments or examples, communication means 62 may be a wired connection, a wireless connection, or some combination of a wired and wireless connection that communicatively connects first processor or controller 54 and second processor or controller 58, which may be separated from each other by a distance. In some non-limiting embodiments or examples, for reasons discussed hereafter, the integrated system may include preconfigured flow system 2 together, or in combination only, with first processor or controller 54, but not second processor or controller 58.

In some non-limiting embodiments or examples, second processor or controller 58 may be a conventional irrigation controller that is programmed or configured to work directly with the data modulated on the electrical output of flow sensor 4 when the inlet 14 of flow sensor 4 is positioned greater than distance or length L1 from a first flow diversion 18a or first flow obstruction 18b, or the outlet 16 of flow sensor 4 is positioned greater than distance or length L2 from a second flow diversion 20a or second flow obstruction 20b, or both, whereupon the data modulated on the electrical output of the flow sensor 4 is accurate for the volume of fluid flowing by, proximate to, or through the flow sensor 4. However, when the inlet 14 of flow sensor 4 is positioned distance or length L1 (less than ten times diameter D1) from a first flow diversion 18a or first flow obstruction 18b, or the outlet 16 of flow sensor 4 is positioned distance or length L2 (less than five times diameter D2) from a second flow diversion 20a or second flow obstruction 20b, or both, the data modulated on the electrical signal output by the flow sensor 4 may be inaccurate for the actual velocity or volume of fluid flowing by, proximate to, or through the flow sensor, e.g., due to turbulence in the fluid being measured by flow sensor 4.

To account for this potential inaccuracy, the first processor or controller 54 can be provided that is programmed or configured with a suitable algorithm programmed or preset with a predetermined calibration value to convert the inaccurate data modulated on the electrical output by flow sensor 4 to corrected (or accurate) data modulated on the second electrical signal that can be output to and used by the second processor or controller 58, e.g., in the nature of a conventional irrigation controller, to accurately determine the volume of fluid flowing by, proximate to, or through the flow sensor 4. That is, the first processor or controller 54 can be programmed or configured to convert the data modulated on the electrical output of the flow sensor 4 that is inaccurate for the actual velocity or volume of fluid actually flowing by, proximate to, or through the flow sensor 4 into corrected data that is modulated on the second electrical signal, which corrected data is different than the inaccurate data and is accurate for the actual velocity or volume of fluid actually flowing by, proximate to, or through the flow sensor 4, which second electrical signal can be provided to the second processor or controller 58, e.g., in the nature of a conventional irrigation controller, which can be programmed or configured to control the volume of fluid provided to an area being irrigated based on the corrected data. Of course, it is envisioned that the functions described above for first processor or controller 54 and second processor or controller 58 can be incorporated into and performed by a single controller, e.g., controller 52.

In one non-limiting embodiment or example, assume that when flow sensor 4 is positioned greater than distance L1 from a first flow diversion or flow obstruction, greater than distance L2 from a second flow diversion or flow obstruction, or both, the data modulated on the electrical signal output by flow sensor 4 can include, for example, one electrical pulse for every single gallon of fluid flowing by, proximate to, or through the flow sensor 4, i.e., flow sensor 4 is programmed or configured to output one electrical pulse for every single gallon of fluid flowing by, proximate to, or through the flow sensor 4. In this example, the electrical signal output by flow sensor 4 can be provided directly to a conventional irrigation controller, e.g., second processor or controller 58, which can be programmed or configured to interpret each electrical pulse output by flow sensor 4 as corresponding to one gallon of fluid flowing by, proximate to, or through the flow sensor 4, and can control the open/closed state of at least one fluid valve to control the volume of fluid (water) provided to an area being irrigated based on a count of the electrical pulses output by flow sensor 4 over a period of time.

Now, assume, for example, that when positioned distance L1 (less than 10 times distance D1) from the first flow diversion or flow obstruction, distance L2 (less than 5 times distance D2) from the second flow diversion or flow obstruction, or both, the data modulated on the electrical signal output by flow sensor 4 includes, in an example, one electrical pulse for every two gallons of fluid (or ½ gallon of fluid) sensed by flow sensor 4 flowing by, proximate to, or through the flow sensor 4, i.e., the data modulated on the electrical signal is inaccurate for the actual or true volume of fluid (±some tolerance) flowing by, proximate to, or through the flow sensor 4. In this scenario, if the data modulated on the electrical signal output by flow sensor 4 is provided directly to the conventional irrigation controller, e.g., second processor or controller 58, that is programmed or configured to interpret each electrical pulse output by flow sensor 4 as corresponding to one gallon of fluid flowing by, proximate to, or through the flow sensor 4, the open/closed state of the at least one fluid valve will be controlled based on an inaccurate determination of the actual volume of fluid flowing by, proximate to, or through the flow sensor 4. Herein, the determined actual volume of fluid flowing by, proximate to, or through the flow sensor 4 may include said actual volume ±2% or ±1% or ±½%.

To avoid such inaccurate determination, first processor or controller 54 can be provided between flow sensor 4 and second processor or controller 58. First processor or controller 54 can be programmed or configured with an algorithm preprogrammed or preset with a calibration value, that when executed converts the inaccurate data modulated on the electrical signal output by flow sensor 4, e.g., one electrical pulse for every two gallons of fluid (or ½ gallon of fluid) sensed by flow sensor 4, into corrected data modulated on the second electrical signal, e.g., one electrical pulse for every one gallon of fluid actually flowing by, proximate to, or through the flow sensor 4. This corrected data modulated on the second electrical signal can be provided to the conventional irrigation controller, e.g., second processor or controller 58, which can control the open/closed state of the at least one fluid valve to control the volume of fluid (water) provided to the area being irrigated based on the corrected data.

The description herein of the data modulated on the electrical signal output by flow sensor 4 and the corrected data modulated on the second electrical signal output by first processor or controller 54 being electrical pulses which are counted is not to be construed in a limiting sense since it is envisioned that one or both of these electrical signals may be analog signals and/or digital signals, the pulse width(s) of the latter of which may correspond to a volume of velocity determined by fluid sensor to be flowing by, proximate to, or through flow sensor 4. Moreover, in the above examples, the volume of fluid associated with each electrical pulse, e.g., ½, one or two gallons per electrical pulse, is strictly for the purpose of illustration and is not to be construed in a limiting sense.

As can be understood from the foregoing, in some non-limiting embodiments or examples, a flow system in accordance with the principles of the present invention may be provided with flow sensor 4 positioned distance L1 (less than ten times diameter D1) from a first flow diversion or flow obstruction, distance L2 (less than five times diameter D2) from a second flow diversion or flow obstruction, or both in combination with first processor or controller 54 programmed or configured to convert the inaccurate electrical signal (having inaccurate data modulated thereon) output by flow sensor 4 into the second (accurate) electrical signal (having corrected data modulated thereon) that can be used by second processor or controller 58 to accurately control the volume of fluid flowing by, proximate to, or through the flow sensor 4.

In an example, this flow system may be provided without the second processor or controller 58. An advantage of this flow system (without the second processor or controller 58) is that it may be used with a conventional irrigation controller without the need to provide the conventional irrigation controller with the flow system, whereupon the end user may use any conventional irrigation controller available from of any number of suppliers. However, this is not to be construed in a limiting sense since it is envisioned, in another example, that the flow system may be provided with a conventional irrigation controller, e.g., the second processor or controller 58.

In some non-limiting embodiments or examples, a flow system in accordance with the principles of the present invention can include flow sensor 4 positioned distance L1 (less than ten times diameter D1) from a first flow diversion or flow obstruction, distance L2 (less than five times diameter D2) from a second flow diversion or flow obstruction, or both in combination with a single controller 52 which can be programmed or configured to integrate and perform the functions of first processor or controller 54 and second processor or controller 58 without the need for communication means 62 to connect first processor or controller 54 and second processor or controller 58.

FIGS. 1, 6, and 7 show non-limiting embodiments or examples of flow systems 2 including example elements or features. However, it is to be appreciated that each of these flow systems 2 may exclude one or more of the illustrated example elements or features or may include additional or alternative elements or features not shown but presently known in the art or hereinafter developed. Accordingly, the flow systems shown in FIGS. 1, 6, and 7 and the descriptions thereof herein are not to be construed in a limiting sense.

As can be seen, disclosed herein, in some non-limiting embodiments or examples, e.g., as shown generically in FIG. 1, is a flow system 2 that includes a flow sensor 4 connected via a plurality of fluid delivery pipes (6, 8) between a fluid source 10 and a fluid distributor 12. The plurality of fluid delivery pipes can include a first pipe 6 connected between the fluid source 10 and an inlet 14 to the flow sensor 4 and can include a second pipe 8 connected between an outlet 16 of the flow sensor 4 and the fluid distributor 12. Proximate the inlet 14 of the flow sensor 4, the first pipe 6 has a first interior diameter D1. Proximate the outlet 16 of the flow sensor 4, the second pipe 8 has a second interior diameter D2.

The distance or length L1 between the inlet 14 of the flow sensor 4 and a flow diversion 18a or a flow obstruction 18b in the fluid path of the first pipe 6 leading to the inlet 14 of the flow sensor 4 is less than ten times the first interior diameter D1. Also or alternatively, a distance or length L2 between the outlet 16 of the flow sensor and a flow diversion 20a or a flow obstruction 20b in the fluid path of the second pipe 8 exiting the flow sensor 4 is less than five times the second interior diameter D2. Flow system 2 may include flow diversion 18a or flow obstruction 18b and not include flow diversion 20a or flow obstruction 20b, or vice versa.

In some non-limiting embodiments or examples, the first and second interior diameters (D1, D2) can be the same or different.

In some non-limiting embodiments or examples, the flow diversion (18a, 20a) of at least one of the first pipe 6 and the second pipe 8 can include: a bend 22 (FIG. 2) in said pipe or a junction 24 (FIG. 3) of at least three portions or sections of said pipe. In an example, the bend 22 can be a right angle or an angle <180°. In an example, the junction 24 can be T-shaped or any other shape having three or more ports (inlet(s) or outlet(s)).

In some non-limiting embodiments or examples, the flow obstruction (18b, 20b) associated with at least one of the first pipe 6 and the second pipe 8 can be a fluid valve 26 (FIG. 5) or another pipe 38 having an interior diameter D3 (FIG. 4) that is less than the first interior diameter D1 and/or the second interior diameter D2.

In some non-limiting embodiments or examples, e.g., as shown in FIG. 6, the flow diversion 18b in the second pipe 8 can be a bend 22. The flow diversion 18a of the first pipe can also or alternatively be a bend 22.

In some non-limiting embodiments or examples, e.g., as shown in FIG. 7, the flow diversion 20a of the second pipe 8 can be a junction 24 between an inlet of the second pipe 8 that is connected to an outlet 16 of the flow sensor 4, a first outlet of the second pipe 8 connected to an inlet 40 of a fluid valve 26, and a second outlet 46 of the second fluid pipe 8. A third pipe 44 can include a flow diversion 50 in the form of a junction 24 between a first inlet of third pipe 44 connected to an outlet 42 of the fluid valve 26, a first outlet of the third pipe 44 connected (directly or indirectly) to the fluid distributor 12, and a second inlet 48 of the third pipe 44. A shunt pipe 28 can be connected in parallel with the fluid valve 26 between the second outlet 46 of the second pipe 8 and the second inlet 48 of the third pipe 44. A fluid valve 30 and/or a hydrogenerator 32 can be mounted to the shunt pipe 28 such that fluid flowing from the second pipe 8 to the third pipe 44 via the shunt pipe 28 flows there-through. The hydrogenerator 32 can generate electrical power in response to the fluid flowing through the hydrogenerator 32.

In some non-limiting embodiments or examples, the flow sensor 4 can be an ultrasonic flow sensor, in particular, time transit ultrasonic flow sensor or meter.

The flow sensor can be programmed or configured to output to a controller 52 an electrical signal related to a velocity or volume of fluid flowing by, proximate to, or through the flow sensor 4; and the controller 52 can be programmed or configured to determine, based on the electrical signal, an actual volume of fluid flowing by, proximate to, or through the flow sensor 4.

The controller 52 can comprise a first processor 54 programmed or configured: with a calibration value related to the distance or length L1, or the distance or length L2, or a type, style, or configuration of the flow diversion or the flow obstruction in the first pipe, or a type, style, or configuration of the flow diversion or the flow obstruction in the second pipe, or some combination thereof; and to determine, based on the electrical signal and the calibration value, a second electrical signal related to an actual velocity or volume of the fluid flowing by, proximate to, or through the flow sensor, wherein the electrical signal and the second electrical signal are different or can include different data modulated thereon.

The controller 52 can also comprise a second processor 58 that can be programmed or configured to determine, based on the second electrical signal, the actual volume of fluid flowing by, proximate to, or through the flow sensor 4. The second processor 58 can be programmed or configured to control the open and closed state of a fluid valve based on the actual volume of fluid determined by the second processor 58 to be flowing by, proximate to, or through the flow sensor 4.

The electrical signal can include data modulated thereon related (inaccurately) to the velocity or volume of the fluid flowing by, proximate to, or through the flow sensor. The second electrical signal can include corrected data modulated thereon related to the actual velocity or volume of fluid flowing by, proximate to, or through the flow sensor. The second processor 58 can programmed or configured to control the open and closed state of a fluid valve based on the corrected data. The data modulated on the electrical signal may be inaccurate for the actual volume of fluid flowing by, proximate to, or through the flow sensor.

In some non-limiting embodiments or examples, the controller 52 can be programmed or configured with an algorithm programmed or preset with a calibration value related to the distance or length L1, or the distance or length L2, or a type, style, or configuration of the first flow diversion or the first flow obstruction (if provided), or a type, style, or configuration of the second flow diversion or the second flow obstruction (if provided), or some combination thereof. The controller can determine, based on said programmed calibration value, the volume of fluid flowing by, proximate to, or through the flow sensor.

Also disclosed herein, in some non-limiting embodiments or examples, e.g., as shown generically in FIG. 1, is a flow system 2 that includes a flow sensor 4, a first pipe 6 configured to transport fluid from an upstream fluid source 10 to the flow sensor 4, and a second pipe 8 configured to transport fluid from the flow sensor 4 to a downstream fluid distributor 12. Proximate the flow sensor 4, the first pipe 6 has a first interior diameter D1 and the second pipe 8 has a second interior diameter D2. A flow diversion 18a or a flow obstruction 18b is positioned between the flow sensor 4 and the upstream fluid source 10 a distance or length L1 from the flow sensor 4, e.g., inlet 14 of flow sensor 4, that is less than ten times the first interior diameter D1 of the first pipe 6. Also or alternatively, a flow diversion 20a or a flow obstruction 20b is positioned between the flow sensor 4 and the downstream fluid distributor 12 a distance or length L2 from the flow sensor 4, e.g., outlet 16 of flow sensor 4, that is less than five times the second interior diameter D2 of the second pipe 8. The first interior diameter D1 and the second interior diameter D2 can be the same or different.

The flow sensor 4 can be programmed or configured to output to a controller 52 an electrical signal related (inaccurately) to a velocity or volume of fluid flowing by, proximate to, or through the flow sensor 4. The controller 52 can be programmed or configured to determine, based on the electrical signal, an actual volume of fluid flowing by, proximate to, or through the flow sensor 4.

The controller 52 can comprise a first processor 54 programmed or configured: with a calibration value related to the distance or length L1, or the distance or length L2, or a type, style, or configuration of the flow diversion or the flow obstruction in the first pipe, or a type, style, or configuration of the flow diversion or the flow obstruction in the second pipe, or some combination thereof; and to determine, based on the electrical signal and the calibration value, a second electrical signal related to an actual velocity or volume of the fluid flowing by, proximate to, or through the flow sensor. The electrical signal and the second electrical signal are different or can include different data modulated thereon.

The controller 52 can also comprise a second processor 58 programmed or configured to determine, based on the second electrical signal, the actual volume of fluid flowing by, proximate to, or through the flow sensor 4.

The second processor 58 can be programmed or configured to control the open and closed state of a fluid valve based on the actual volume of fluid determined by the second processor 58 to be flowing by, proximate to, or through the flow sensor 4.

The electrical signal can include data modulated thereon related (inaccurately) to the velocity or volume of the fluid flowing by, proximate to, or through the flow sensor 4. The second electrical signal can include corrected data modulated thereon related to the actual velocity or volume of fluid flowing by, proximate to, or through the flow sensor. The second processor 58 can be programmed or configured to control the open and closed state of a fluid valve based on the corrected data. The data on the electrical signal may be inaccurate for the actual volume of fluid flowing by, proximate to, or through the flow sensor.

The controller 52 can be programmed or configured with an algorithm that includes a variable programmed with a calibration value related to the distance or length L1, or the distance or length L2, or a type, style, or configuration of the first flow diversion or the first flow obstruction, or a type, style, or configuration of the second flow diversion or the second flow obstruction, or some combination thereof. The controller can determine, based on said programmed calibration value, the volume of fluid flowing by, proximate to, or through the flow sensor.

The type, style, or configuration of at least one of the first flow diversion 18a and the second flow diversion 20a can be a bend 22 (FIG. 2) or a junction 24 (FIG. 3). The bend 22 can be a right angle or another angle <180°. The junction 24 can be T-shaped or any other shape having three or more ports (inlet(s) and outlet(s)).

The type, style, or configuration of at least one of the first flow obstruction 18*b* and the second flow obstruction 20*b* can be a valve 25 (FIG. 5) or another pipe 28 (FIG. 4) having an interior diameter D3 that is less than the respective first interior diameter D1 of the first pipe and the second interior diameter D2 of the second pipe.

In some non-limiting embodiments or examples, where controller 52 comprises first processor or controller 54 in combination with second processor or controller 58, e.g., in the nature of a conventional irrigation controller, first processor or controller 54 may include an optional radio module or radio 64 (FIG. 8), e.g., a radio transmitter or radio transceiver, the use of which will be described hereinafter. In this non-limiting embodiment or example, first processor 54 may be programmed or configured, in the manner described above, to determine from the electrical signal output by flow sensor 4 the actual volume of fluid passing by, proximate to, or through flow sensor 4 during a period of time via a calibration value. This actual volume of fluid passing by, proximate to, or through flow sensor 4 can be used by second processor or controller 58, e.g., in the nature of a conventional irrigation controller, in a manner known in the art to control the open/closed state of at least one fluid valve to control the volume of fluid (water) provided to an area being irrigated based on a count of the electrical pulses output by flow sensor 4 over a period of time.

In addition, first processor or controller 54 may also be programmed or configured to, based on the actual volume of fluid determined to be passing by, proximate to, or through flow sensor 4 during the period of time, determine and store, in memory 56 of first processor or controller 54, a total volume of fluid determined to be passing by, proximate to, or through flow sensor 4 during a number of said periods of time or over an extended period of time. For example, assume that based on the inaccurate electrical signal output by flow sensor 4, first processor or controller 54, using the calibration value, determines that the actual volume of fluid flowing by, proximate to, or through the flow sensor 4 is one gallon per unit of time, e.g., one gallon per minute. In an example, first processor or controller 54 may be programmed or configured to accumulate or sum the actual volume of fluid flowing per unit of time over a number of periods of time. In an example, assuming a constant actual volume of fluid flowing of one gallon per minute, first processor or controller 54 can determine that a total of 60 gallons of fluid flow by, proximate to, or through the flow sensor 4 in 60 minutes (or one hour); a total of 120 gallons of fluid flow by, proximate to, or through the flow sensor 4 in 120 minutes (or two hours); or a total of X gallons of fluid flow by, proximate to, or through the flow sensor 4 in X minutes.

In another example, first processor or controller 54 may be programmed or configured to accumulate or sum the actual volume of fluid flowing at one or more of different times of a single day, at different times on different days, at different times on different weeks, at different times during a single month, at different times during different months, etc. For example, assume that second processor or controller 58 is programmed or configured to control the open and closed state of one or both of fluid valves 26 and 30 (FIG. 7) such that twice a day, e.g., in the morning and in the evening, 100 actual gallons of fluid passes by, proximate to, or through flow sensor 4 to fluid distributor 12. Based on this programming or configuration, first processor or controller 54 may accumulate or sum the actual volume of fluid flowing to fluid distributor 12, for example, as follows: Day 1, 200 gallons; Day 2, 400 gallons (200 gallons on day 2+the 200 gallons from day 1); Day 3, 600 gallons (200 gallons on day 3+the 400 gallons from days 1 and 2); Week 1, 1400 gallons (200 gallons per day for Days 1-7 of the week); Month 1 (assuming a 30 day month), 6,000 gallons (200 gallons per day for Days 1-30 of the month); Month 2 (assuming a 30 day month), 12,000 gallons (6,000 gallons per day for Days 1-30 of Month 2+the 6,000 gallons for Month 1), etc.

The examples herein are strictly for the purpose of illustration and are not to be construed in a limiting sense since it is envisioned that a total volume of fluid determined by first processor or controller 54 to be passing by, proximate to, or through flow sensor 4 can be based on any rate of fluid flow (gallons/unit of time) over any desirable period of time, e.g., minute(s), hour(s), day(s), month(s), etc. In some non-limiting embodiments or examples, the total volume of fluid data determined by first processor or controller 54 and stored in memory 56, for example, may be reset to zero manually or automatically, e.g., manually via an optional user interface (UI) 74 of controller 52 (FIG. 8), or after a predetermined period of time, e.g., reset every week or month, or upon upload of the total volume of fluid data to a smart device 68 described hereinafter.

In some non-limiting embodiments or examples, an optional radio 64 may be utilized by first processor or controller 54 to wirelessly communicate or upload the accumulated or summed actual volume of fluid determined by first processor or controller 54 to be passing by, proximate to, or through flow sensor 4 and stored in memory 56 to a remote server 66 via a smart device 68 with wireless communication means. Hereinafter "the accumulated or summed actual volume of fluid" to be uploaded or which was uploaded may, depending on the context, sometimes be referred to as "the data to be uploaded'", "uploaded data", "data uploaded", "the data", and the like.

In some non-limiting embodiments or examples, smart device 68 may be, e.g., without limitation, a smartphone, a tablet computer, a smartwatch, or any other device now known or hereinafter developed that includes a hardware layer including at least one radio that transmits and receives radio signals, a network layer through which radio connected devices communicate with each other, and an application (or software) layer through which an end user delivers commands. The particular type of device comprising smart device 68 is not to be construed in a limiting sense.

In some non-limiting embodiments or examples, the wireless communication means of smart device 68 may include a first radio transceiver 76 and a second radio transceiver 78. In some non-limiting embodiments or examples, and depending on the application, each radio transceiver 76 and/or 78 may only have and/or utilize a radio transmitting function or a radio receiving function. However, this is not to be construed in a limiting sense since it is envisioned that each radio transceiver 76 and/or 78 will typically have both radio transmitting and radio receiving functionality. Moreover, while smart device 68 will be described herein as having a first radio transceiver 76 and a second radio transceiver 78, it is to be understood that first radio transceiver 76, second radio transceiver 78, or both may be implemented by the same, different, or shared hardware and/or software of smart device 68.

In some non-limiting embodiments or examples, smart device 68, which may be owned and operated by a third party or user, may be programmed or configured to run a software application that causes smart device 68 and the first and second radio transceivers 76 and 78 to operate in the manner described herein. However, this is not to be construed in a limiting sense.

In an example, smart device 68 may be programmed or configured to cause first radio transceiver 76 to wirelessly communicate with and exchange or receive data from radio 64 when first radio transceiver 76 and radio 64 are in direct wireless communication range of each other. In an example, first processor 54 and smart device 68 may be programmed or configured such that when first radio transceiver 76 and radio 64 are in wireless communication range, first radio transceiver 76 and radio 64 may enter into wireless communication and form a wireless link or communication channel 72 and the data to be uploaded may be manually or automatically forwarded or uploaded to smart device 68 via the wireless link 72. In some non-limiting embodiments or examples, smart device 68 may be further programmed or configured to, manually or automatically, forward or upload the data uploaded to smart device 68 via the wireless link 72 to a remote server 66 via a communication channel 80 that may be formed between the second radio transceiver 78 and the internet 70 or any other suitable and/or desirable wide area network.

In some non-limiting embodiments or examples, wireless communication between radio 64 and first radio transceiver 76 may be via the wireless link 72 that operates using a first wireless technology standard. e.g., the Bluetooth® wireless technology standard. However, this is not to be construed in a limiting sense as it is envisioned that said wireless communication can be via any suitable and/or desirable wireless technology standard, e.g., Wi-Fi, LTE, CDMA, GSM, and the like, now known or hereinafter developed. Bluetooth® is a registered trademark of Bluetooth SIG, Inc. of Delaware.

In some non-limiting embodiments or examples, the communication channel 80 between smart device 68 and internet 70 may be a wired communication channel, a wireless communication channel, e.g., Wi-Fi, LTE, CDMA, GSM, and the like, or some combination of a wired communication channel and a wireless communication channel. In some non-limiting embodiments or examples, communication channel 80 may be provided or facilitated in a manner known in the art, at least in part, by one or more of a wireless, e.g., a cellular service provider, via Wi-Fi service, and/or via a wired connection, e.g., smart device 68 may be connected via a wired or wireless connection to a computer which, in-turn, is connected to the internet 70 in a manner known in the art.

In one non-limiting embodiment or example, and for the purpose of describing the present invention, the portion of communication channel 80 to/from second radio transceiver 78 will be described herein as a cellular service provided by a cellular service provider in a manner known in the art, which cellular service is able to form the portion of the communication channel 80 between the second radio transceiver 78 and the Internet 70 and, hence, server 66, in a manner known in the art. However, this is not to be construed in a limiting sense. Moreover, inasmuch as the means (e.g., hardware and/or software) and by which a cellular service is able to form and use communication channel 80 to communicatively connect smart device 68 to server 66 via the Internet 70 is known in the art, details regarding such means will not be further described herein for simplicity.

In some non-limiting embodiments or examples, server 66 may be programmed or configured to run a software application that is designed to function in cooperation with the software application that runs on smart device 68 to facilitate the uploading of the data that was uploaded from first processor or controller 54 to the software application running on smart device 68 to the software application running on server 66 via the internet 70 in the manner described herein. However, this is not to be construed in a limiting sense.

In some non-limiting embodiments or examples, the uploaded data is provided from first processor 54 to smart device 68 using a first wireless technology standard, e.g., without limitation, Bluetooth®, while the data uploaded to smart device 68 may be uploaded, via communication channel 80 and Internet 70, to server 66 at least in part using a second wireless technology standard, e.g., Wi-Fi, LTE, CDMA, GSM, and the like.

Figure 9:
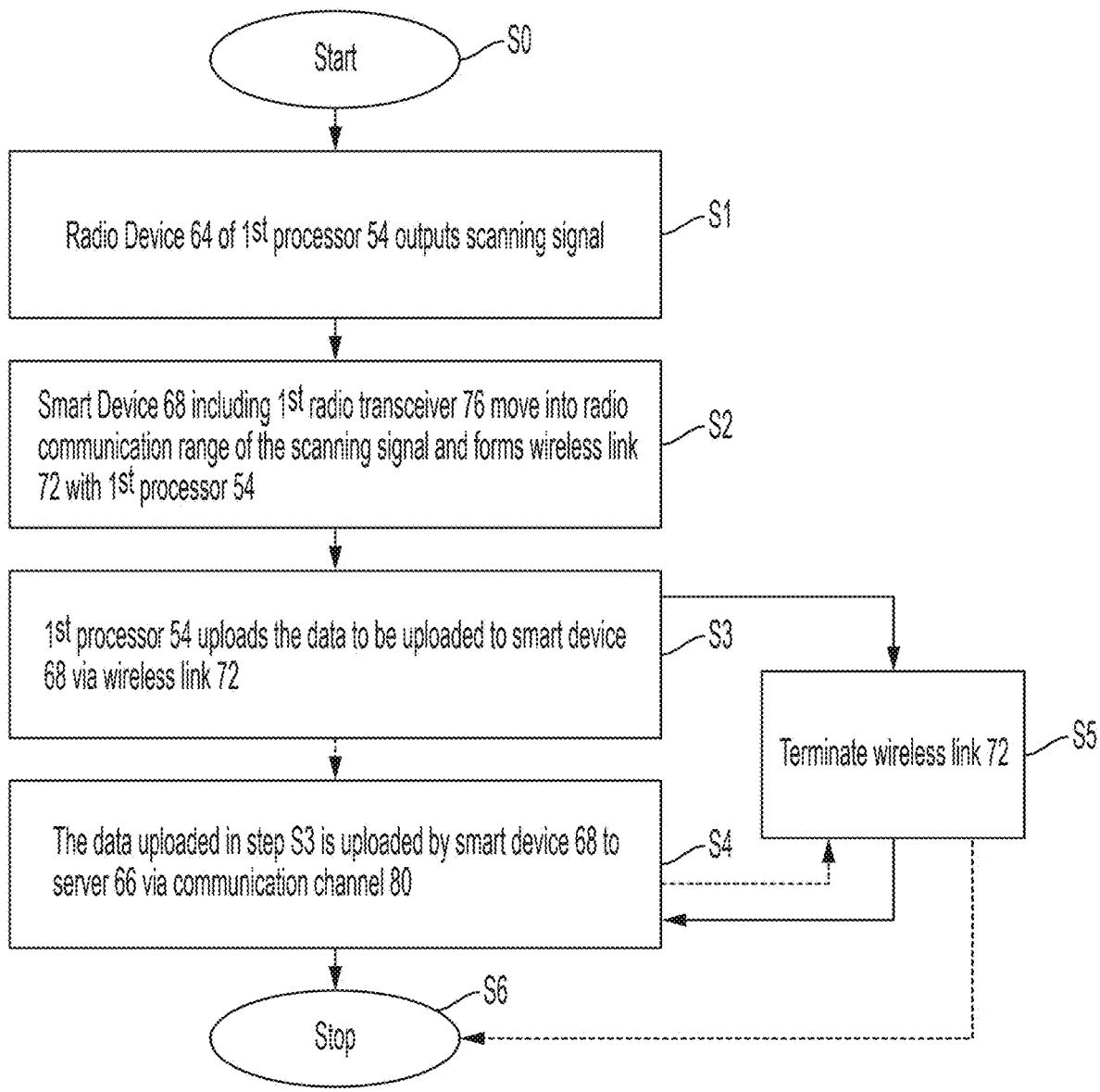
FIG. 9 is a flow chart of a method in accordance with the principles of the present invention.

With reference to the flow diagram of FIG. 9 and with continuing reference to FIG. 8, in some non-limiting embodiments or examples, beginning from step SO in FIG. 9, smart device 68 and first processor 54 may be programmed or configured such that radio 64, via the first wireless technology standard, outputs a scanning signal (step S1) for detection by the first radio transceiver 76 of smart device 68. In an example, this scanning signal may be output by radio 64 periodically, aperiodically, continuously, or in response to detecting an interrogation signal output by first radio transceiver 76 of smart device 68. However, this is not to be construed in a limiting sense. In some non-limiting embodiments or examples, wireless link 72 may be formed manually, e.g., by an operator of smart device 68, or automatically via the programming or configuration of first processor 54 and smart device 68, or some combination thereof.

Upon detecting the scanning signal output by radio 64, e.g., when the first radio transceiver 76 of smart device 68 moves into or is in radio communication range of radio 64, radio 64 and the first radio transceiver 76 of smart device 68 form the wireless link 72 (step S2) whereupon the data to be uploaded is then uploaded (uploaded data) via the wireless link 72 to smart device 68 (step S3). Smart device 68 may, in-turn, communicate or upload the data uploaded to smart device 68 in step S3, via communication channel 80 using the second wireless technology standard, to server 66 via the internet 70 (step S4) in the manner described above. In some non-limiting embodiments or examples, the software applications running on smart device 68 and server 66 may be configured to cooperate in a manner that facilitates or enables the data uploaded to smart device 68 to be provided via the internet 70 from smart device 68 to server 66, manually, automatically, or some combination thereof.

As a suitable time, the wireless link 72 between first radio transceiver 76 and radio 64 may be terminated (step S5). As shown by solid lines in FIG. 9, step S5 may occur before step S4 or, as shown by dashed lines in FIG. 9, step S5 may occur after step S4. In some non-limiting embodiments or examples, the wireless link 72 may terminate automatically when the first radio transceiver 76 of smart device 68 and the radio 64 of first processor 54 move out of radio communication range, e.g., by smart device 68 being moved relative to first processor 54 which, in some non-limiting embodiments or examples, may be stationary. In another example, the wireless link 72 may be terminated by a user of smart device 68 via a user interface thereof and/or by a user of first processor 54 via an optional user interface (UI) 74 (FIG. 8). In another example, the wireless link 72 may be automatically terminated once the data has been uploaded from first processor 54 to smart device 68.

As can be seen, in some non-limiting embodiments or examples, an advantage of having first processor 54 including radio 64 is the ability to accumulate or sum the data (the accumulated or summed actual volume of fluid determined by first processor 54 to be passing by, proximate to, or through flow sensor 4 and stored in memory 56) to be uploaded and then upload said data to server 66 via smart device 68 and internet 70 for use by one or more third parties (e.g., municipalities, water authorities, etc.). As best understood, the ability for first processor 54 (separate from second processor 58, in the nature of a conventional irrigation controller) to accumulate the data to be uploaded and then upload said data to a server does not exist in presently known irrigation systems because, as best understood, there is presently no known reason to provide the accumulated or summed actual volume of fluid used by flow system 2 (e.g., an irrigation system) to a server 66 for use by one or more third parties. For example, fluid (water) provided by fluid source 10 (shown in any of the embodiments shown in FIGS. 1,6, and 7) of flow system 2 may be reclaimed water which, at the present time, may not be subject to processing, control, management, and/or billing, e.g., by a municipality or water authority. Hence, in this example, there is no need to track the accumulated or summed actual volume of fluid used for irrigation using reclaimed water and upload this data.

In another example, fluid (water) provided by fluid source 10 (shown in any of the embodiments shown in FIGS. 1,6, and 7) of flow system 2 may, in an example, be subject to separate billing for the providing of the water and for the disposal of wastewater. In an example, where a portion of the total volume of water provided is used for irrigation (and is not wastewater requiring treatment by a wastewater treatment plant and subsequent billing for said treatment), this portion of the water (used for irrigation) is oftentimes estimated or determined separately and is thereafter manually processed and subtracted during the billing process from the total volume of water provided (as determined via a separate water meter that is not shown) to determine the volume of water that is wastewater (and not irrigation water) and, therefore, is subject to billing for wastewater treatment versus irrigation water which may not be subject to billing for wastewater treatment. In other words, the accumulated or summed actual volume of fluid used only for irrigation over a period of time, e.g., one billing cycle, may be determined in the manner described above and uploaded to server 66 and subtracted from the total volume of water provided to a user to determine for the user the volume of water used that is wastewater and, therefore, subject to billing for wastewater treatment, versus the volume of water used for irrigation which may not be subject to billing for wastewater treatment.

Another advantage of having first processor 54 including radio 64 accumulate or sum the data to be uploaded and then upload said data to server 66 is that first processor 54 and radio 64 may operate independently of having to access an irrigation system (that includes, for example, second processor 58) known in the art that includes and runs in accordance with the programming or configuration of second processor 58 of said irrigation system. As best understood, the foregoing represents an improvement over presently known state of the art irrigation systems which do not have means, independent of second processor 58, in the nature of a conventional irrigation controller, to provide the uploaded data to a server for use by a third party.

In some non-limiting embodiments or examples, and with reference to FIGS. 1 and 6 for example, the following elements may be provided together as a preconfigured system which may be freely installed apart from second processor 58, in the nature of a conventional irrigation controller:

flow sensor 4, first pipe 6 fluidly connected to inlet 14 of first pipe 6, first flow diversion or flow obstruction (18*a* or 18*b*) positioned on an end of first pipe 6 opposite flow sensor 4 distance L1 less than ten times diameter D1 from flow sensor 4, second pipe 8 fluidly connected to outlet 16 of first pipe 6, second flow diversion or flow obstruction (20*a* or 20*b*) positioned on an end of second pipe 8 opposite flow sensor 4 distance L2 less than five times diameter D2 from flow sensor 4, and first processor 54, including memory 56, programmed or configured to convert the inaccurate electrical signal (having inaccurate data modulated thereon) output by flow sensor 4 into the second (accurate) electrical signal (having corrected data modulated thereon) that can be used by second processor 58 to accurately control the volume of fluid flowing by, proximate to, or through the flow sensor 4.

In some non-limiting embodiments or examples of this preconfigured system, all of the elements may be fixedly coupled together for ease of installation and to avoid changes in one or both of distances L1 and L2, which changes in distance(s) may adversely the accuracy of the second electrical signal output by first processor 54 based on the calibration value programmed into memory 56 of first processor 54 based on said distance(s). In an example, first processor 54, including memory 56, may be physically coupled to one or more exteriors of flow sensor 4, first pipe 6, first flow diversion 18*a* or flow obstruction 18*b*, second pipe 8, and/or second flow diversion 20*a* or flow obstruction 20*b*.

In some non-limiting embodiments or examples, the application running on remote server 66 may be programmed or configured to cause the determined volume uploaded to remote server 66 to be provided, e.g., via the internet 70, to an application running on a computing device 82 run by, or on behalf of, a third party, such as, without limitation, a municipality, a water authority, etc. for any suitable and/or desirable purpose(s). Non-limiting examples of such purpose(s) may include, without limitation, billing and water management. In an example, computing device 82 may be any suitable and/or desirable computing device now known or hereafter developed that is able to receive, process, and, optionally, display the determined volume. Non-limiting examples of computing device 82 include: a laptop or desktop computer, a tablet computer, a smart phone, and the like.

Figure 10:
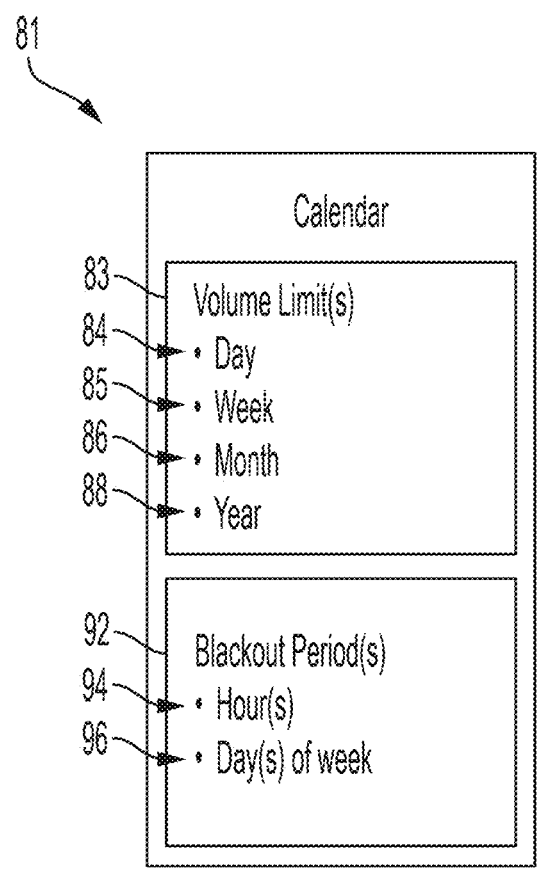
FIG. 10 is a block diagram of an optional software calendar in accordance with the principles of the present invention.

With reference to FIG. 10, and with ongoing reference to FIGS. 7-8, in some non-limiting embodiments or examples, controller 52, e.g., without limitation, first processor 54, may include a control output 98 and may be programmed or configured, e.g., via optional UI 74, with an optional software calendar 81 that may be programmed or configured with one or more volume limits 83 for one or more periods of time, such as, for example, daily volume 84, weekly volume 85, monthly volume 86, and/or yearly volume 88 of fluid to be provided to fluid distributor 12, which volume limit(s) 83 may be set and/or reset, e.g., via UI 74. This calendar 80 may derive its time or period, e.g., without limitation, one or more days, one or more weeks, one or more months, one or more years, and/or other date information, from an optional calendar/clock 90 of or associated with first processor 54, e.g., without limitation, an optional internal calendar/clock 90 of first processor 54. Once the volume limit is reached, the fluid valve(s) 26 and/or 30 may be controlled by first processor 54, via the control output 98 thereof (FIG. 8), to be in a closed state, whereupon the flow is restricted, prevented, or stopped until reset by the next day, week, month, or year.

In an example, assume the calendar is programmed or configured with a volume limit that causes first processor 54 to limit the actual volume of fluid passing by, proximate to, or through flow sensor 4 to 5,000 gallons per month, e.g., 100 gallons provided each morning and 100 gallons provided each evening (200 gallons per day) for 25 days. Assuming, for example, this limit is reached on the $25^{th}$ day of the month, first processor 54, operating under the control of the monthly volume limit will, via the control output 98 of first processor 54 regardless of the programming of second processor 58, cause fluid valve(s) 26 and/or 30 to remain in closed state(s) until it is determined via the calendar that it is the $1^{st}$ day of the following month whereupon, first processor 54 releases control of the state of the fluid valve(s) 26 and/or 30 to second processor 58 which can then (in a manner described hereinafter) control the state(s) of fluid valve(s) 26 and/or 30 in accordance with the conventional programming of second processor 58 in the nature of a conventional irrigation controller, e.g., 100 actual gallons are provided to fluid distributor 12 each morning and 100 actual gallons are provided to fluid distributor 12 each evening until 5,000 gallons is provided in the month.

In some non-limiting embodiments or examples, the calendar may also or alternatively be programmed or configured with one or more blackout periods 92 during which fluid valve(s) 26 and/or 30 may be maintained in a closed state, whereupon no fluid flows to fluid distributor 12, regardless of the conventional or other programming of controller 52, in particular second processor 58 in the nature of a conventional irrigation controller. For example, suppose flow system 2 is used to irrigate a golf course that is open from 7 am to 6 pm Monday-Saturday of each week. Further, suppose that the conventional programming of second processor 58 is set to open fluid valve(s) 26 and/or 30 and irrigate the golf course via, for example, at least fluid distributor 12, from 5-6 am, 1-2 pm, and 7-8 pm each day (Sunday-Saturday) of the week. Under this scenario, the calendar 80, which, in some non-limiting embodiments or examples, resides in memory 56 of first processor 54, may be programmed or configured with a blackout period from 7 am to 6 pm Monday-Saturday of each week, whereupon on these days, the irrigation from 1-2 pm each day Monday-Saturday is prevented while the irrigation from 5-6 am and 7-8 pm each day Monday-Saturday is allowed to proceed. However, on Sunday of each week, irrigation is allowed to proceed between 5-6 am, 1-2 pm, and 7-8 pm, i.e., since, in this scenario, the blackout period does not apply on Sundays. In some non-limiting embodiments or examples, blackout periods may include, without limitation, certain hours 94 (FIG. 10) of each day, and/or days 96 (FIG. 10) of a week, such as odd or even days of the week, where irrigation is prevented.

In some non-limiting embodiments or examples, first processor 54 may also or alternatively be programmed or configured to detect a leak (leak detection) in flow system 2. In an example, first processor 54 may be programmed or configured to detect an actual volume of fluid passing by, proximate to, or through flow sensor 4 greater than a preset or predetermined volume value during one or more non-scheduled irrigation periods or events, i.e., when all of the fluid valves are supposed to be closed, whereupon, if the detected volume of fluid passing by, proximate to, or through flow sensor 4 is greater than the predetermined volume value, first processor 54 may be programmed or configured to conclude the presence of a leak (leak detection), whereupon first processor 54 may attempt to close one or more valve(s) 26 and/or 30 in an attempt to stop or reduce the leak and/or output a suitable alarm on UI 74, e.g., a flashing light, display a symbol on a display of UI 74, and/or output an audio alarm, and/or output an email or text message alert to computing device 82 via server 66 when the first radio transceiver 76 of smart device 68 is in range of radio 64.

Also or alternatively, in some non-limiting embodiments or examples, if first processor 54 detects an actual volume of fluid passing by, proximate to, or through flow sensor 4 greater than a preset or predetermined maximum irrigation value during one or more irrigation periods or events, first processor 54 may be programmed or configured to conclude the presence of a break (break detection) in the plumbing of flow system 2 and/or of the valves and/or sensors thereof and may attempt to close one or more valve(s) of flow system 2 in an attempt to stop or reduce the flow of fluid due to the break and/or output a suitable alarm on UI 74, e.g., a flashing light, display a symbol on a display of UI 74, and/or output an audio alarm, and/or output an email or text message alert to computing device 82 via server 66 when the first radio transceiver 76 of smart device 68 is in range of radio 64.

One advantage of volume limit(s), blackout period(s), leak detection, and/or break detection is that unwanted fluid (water) usage can be detected (leak detection and/or break detection) and/or controlled (volume limit(s) and/or blackout period(s)), for example, independently of the conventional programming of second processor 58 in the nature of a conventional irrigation controller. In some non-limiting embodiments or examples, the programming or configuration of first processor 54 with one or more of the volume limit(s), blackout period(s), leak detection, and/or break detection may be via supervisory access to the software routine(s) associated with the volume limit(s), blackout period(s), leak detection, and/or break detection. In this way, irrigation via flow system 2 may be effectively managed in accordance with local watering regulations enforced by municipalities, water authorities, etc.

In some non-limiting embodiments or examples, second processor 58 may be a conventional irrigation controller while first processor 54 may be added to flow system 2 and may be programmed or configured with any one or more of the features described above. An advantage of this arrangement is that first processor 54 may be added to a conventional irrigation system that includes second processor 58, produced and distributed by any number of manufacturers without having to redesign the programming or configuration of the second processor 58 of said irrigation system. In this way, controller 52 can be formed by the addition of first processor 54 to a conventional irrigation system that includes second processor 58 to add any one or more of the features described above to said conventional irrigation system. However, this is not to be construed in a limiting sense since it is envisioned that the functions of the first and second processors 54 and 58 described herein may be consolidated into and run by single processor forming controller 52.

In some non-limiting embodiments or examples, also or alternatively to controlling the open/closed state(s) of fluid valve(s) 26 and/or 30 via the control output 97 of second processor 58, the open/closed state(s) of fluid valve(s) 26 and/or 30 may be controlled, via the control output 98 of first processor 54, by first processor 54 or by second processor 58 via first processor 54. In one non-limiting embodiment or example, second processor 58 may include a second control output 99 connected to first processor 54 which may be programmed or configured to control the open/closed state (s) of fluid valve(s) 26 and/or 30 via control output 98 either in accordance with control signals output on the second control output 99 of second processor 58 based on the programming of second processor 58 or, preferentially, in accordance with the programming of first processor 54 when a predetermined event occurs, e.g., a volume limit being reached, being in a blackout period, a leak detected, and/or a break detected. In one non-limiting embodiment or example, the second control output 99 may conduct the same electrical signals as the control output 97 which, in an example, may be omitted or simply not coupled to control the state(s) of fluid valve(s) 26 and/or 30 when the state(s) of fluid valve(s) 26 and/or 30 are being controlled via electrical signals being output on control output 98 of first processor 54.

In an example, assume the state(s) of fluid valves 26 and/or 30 is/are initially being controlled via the control output 98 of first processor 54 in accordance with the programming of second processor 58, in the nature of a conventional irrigation controller, via electrical signals output by second processor 58 to first processor 54 on second control output 99 and the control output of 97 of second processor 58 is not coupled to fluid valve(s) 26 and/or 30. When first processor 54 determines the occurrence of a predetermined event (e.g., a volume limit being reached, being in a blackout period, a leak detected, and/or a break detected), the first processor 54 terminates controlling the state(s) of fluid valves 26 and/or 30 in accordance with the electrical signals output by second processor 58 to first processor 54 on the second control output 99 and commences controlling the state(s) of fluid valves 26 and/or 30 in accordance with the programming or configuration of first processor 54, e.g., volume limit(s), blackout period(s), leak detection, and/or break detection. Upon determining the conclusion of the predetermined event, the first processor 54 may revert back to allowing the state(s) of fluid valves 26 and/or 30 to be controlled via the control output 98 of first processor 54 in accordance with the programming of second processor 58 via electrical signals output by second processor 58 to first processor 54 on second control output 99

Herein, by way of illustration and not of limitation, each control output 97 and 98 and the second control output 99 may comprise one or more conductors conducting one or more electrical signals. Accordingly, the illustration (FIG. 8) of each control output 97 and 98 as a single line and the second control output 99 as a single line and the discussion thereof herein is not to be construed in a limiting sense.

The foregoing discussion regarding how fluid valve(s) 26 and/or 30 may be controlled by first processor 54 based on control signals output on the second control output of 99 of second processor 58, which control signals are based on the programming of second processor 58 or, preferentially, in accordance with the programming of first processor 54 when a predetermined event occurs is not to be construed in a limiting sense.

As can be seen, also disclosed herein is a flow system comprising a flow sensor connected to conduct a fluid between a fluid source and a fluid distributor, said flow sensor programmed or configured to output to a processor an electrical signal related to a velocity or volume of fluid flowing by, proximate to, or through the flow sensor; and at least one fluid valve connected to conduct a fluid between the flow sensor and the fluid distributor, wherein: the processor is programmed or configured to determine, based on the electrical signal, the volume of fluid flowing by, proximate to, or through the flow sensor, to determine a second electrical signal based on the electrical signal, and to output the second electrical signal to an irrigation controller; and the processor includes a radio that is operative for wirelessly communicating the determined volume to a remote server.

The volume of fluid determined by the controller from the electrical signal can be an actual volume of fluid flowing by, proximate to, or through the flow sensor.

The flow system can include an application running on a user smart device that causes the smart device to receive the determined volume wirelessly communicated via the radio of the controller and to communicate the determined volume to an application running on the remote server.

The determined volume can be communicated to the application running on the remote server via a wireless communication channel, or a wired communication channel, or a combination of a wired and a wireless communication channel.

The processor can be programmed or configured to cause the radio to output a scanning signal. In response to a first radio, e.g., a first radio transceiver, of the smart device detecting the scanning signal, a wireless link can be formed between the first radio transceiver of the smart device and the radio of the processor. The determined volume can be wirelessly communicated to the smart device via the wireless link.

Following the determined volume being wirelessly communicated to the smart device via the wireless link, the wireless link can be terminated.

The application running on the remote server can be programmed or configured to cause the determined volume to be provided to an application running on a computing device.

The processor can be programmed or configured with a software calendar that includes at least one of a volume limit or a blackout period. In response to the processor determining from the determined volume over a first period of time that the volume limit for said first period of time is reached, the processor can control the fluid valve to restrict, prevent, or stop fluid flowing through the fluid valve until the start of a second, ensuing or following period of time. During the blackout period, the processor can restrict, prevent, or stop fluid flowing through the fluid valve regardless of the programming of the irrigation controller.

Each period of time can be one or more days, one or more weeks, one or more months, or one or more years.

The processor can be programmed or configured to determine that the determined volume passing by, proximate to, or through flow sensor during a period when fluid is not to be provided to the fluid distributor is greater than a predetermined volume value and, in response, to take at least one of the following actions: close the fluid valve, or output an alarm.

The processor can be programmed or configured to determine that the determined volume passing by, proximate to, or through the flow sensor during a period when fluid is to be provided to the fluid distributor is greater than a predetermined maximum volume value and, in response, to take at least one of the following actions: close the fluid valve, or output an alarm.

Also disclosed is a method of operating the flow system of comprising: (a) causing the radio of the processor to output a scanning signal; (b) upon the smart device including the first radio moving into radio communication range of the scanning signal, forming between the radio of the processor and the first radio of the smart device a wireless link; (c) following step (b), the processor uploading the determined volume to the smart device via the wireless link; (d) following step (c), the smart device uploading the determined volume uploaded to the smart device in step (c) to the remote server via a communication channel; and (e) following step (d), terminating the wireless link between the radio of the processor and the first radio of the smart device.

The communication channel can be a wired communication channel, a wireless communication channel, or a combination of a wired and a wireless communication channel.

The smart device can include a second radio that forms at least a portion of the communication channel wirelessly.

The method can include enforcing, by the processor, a volume limit or a blackout period based on a software calendar included with the controller. In response to the processor determining from the determined volume over a first period of time that the volume limit for said first period of time is reached, the processor can control the fluid valve to restrict, prevent, or stop fluid flowing through the fluid valve until the start of a second, ensuing or following period of time. During the blackout period, the processor can restrict, prevent, or stop fluid flowing through the fluid valve regardless of other programming of the controller.

Also disclosed is a flow system comprising: a processor programmed or configured to determine a volume of fluid flowing by, proximate to, or through a flow sensor and to communicate to a smart device the determined volume and to communicate to an irrigation controller a signal used to determine the determined volume; the smart device running a software application that configures a smart device to communicate with the processor and receive at the smart device the determined volume communicated by the processor; and a server software application that configures a server to communicate with the smart device and receive at the server the determined volume received at the smart device.

The determined volume can be communicated from the processor to the smart device via a wireless link. The determined volume can be communicated from the smart device to the server via a communication channel. The communication channel can be a wired communication channel, a wireless communication channel, or a combination of wired and wireless communication channel.

The wireless link can be formed using a first wireless technology standard and the communication channel is formed at least in part using a second wireless communication standard.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that can be within the spirit and scope of the appended claims. For example, it is to be understood that the present invention contemplates that, to the extent possible, one or more features of any embodiment can be combined with one or more features of any other embodiment.

The invention claimed is:

1. A flow system comprising:
a flow sensor connected to sense a fluid flow between a fluid source and a fluid distributor, said flow sensor programmed or configured to output to a processor an electrical signal related to a velocity or volume of fluid flowing by, proximate to, or through the flow sensor; and
at least one fluid valve connected to conduct the fluid between the flow sensor and the fluid distributor, wherein:
the processor is programmed or configured to determine, based on the electrical signal, the volume of fluid flowing by, proximate to, or through the flow sensor, a second electrical signal based on the electrical signal, and to output the second electrical signal to an irrigation controller;
the processor includes a radio that is operative for wirelessly communicating the determined volume to a remote server; and
the processor is programmed or configured with a software calendar that includes at least one of a volume limit or a blackout period, wherein:
in response to the processor determining from the determined volume over a first period of time that the volume limit for said first period of time is reached, the processor controls the fluid valve to restrict, prevent, or stop fluid flowing through the fluid valve until the start of a second, ensuing or following period of time; and
during the blackout period, the processor restricts, prevents, or stops fluid flowing through the fluid valve regardless of the programming of the irrigation controller.

2. The flow system of claim 1, wherein each period of time is one or more days, one or more weeks, one or more months, or one or more years.

3. A method of operating a flow system that includes a flow sensor connected to sense a fluid flow between a fluid source and a fluid distributor, said flow sensor programmed or configured to output to a processor an electrical signal related to a velocity or volume of fluid flowing by, proximate to, or through the flow sensor; and at least one fluid valve connected to conduct the fluid between the flow sensor and the fluid distributor, wherein: the processor is programmed or configured to determine, based on the electrical signal, the volume of fluid flowing by, proximate to, or through the flow sensor, to determine a second electrical signal based on the electrical signal, and to output the second electrical signal to an irrigation controller; and the processor includes a radio that is operative for wirelessly communicating the determined volume to a remote server, the method comprising:
(a) causing the radio of the processor to output a scanning signal;
(b) upon a smart device including a first radio moving into radio communication range of the scanning signal, forming between the radio of the processor and the first radio of the smart device a wireless link;
(c) following step (b), the processor uploading the determined volume to the smart device via the wireless link;
(d) following step (c), the smart device uploading the determined volume uploaded to the smart device in step (c) to the remote server via a communication channel; and
(e) following step (d), terminating the wireless link between the radio of the processor and the first radio of the smart device.

4. The method of claim 3, wherein the communication channel is a wired communication channel, a wireless communication channel, or a combination of a wired and a wireless communication channel.

5. The method of claim 3, wherein the smart device includes a second radio that forms at least a portion of the communication channel wirelessly.

6. The method of claim 3, further including enforcing, by the processor, a volume limit or a blackout period based on a software calendar, wherein:
- in response to the processor determining from the determined volume over a first period of time that the volume limit for said first period of time is reached, the processor controls the fluid valve to restrict, prevent, or stop fluid flowing through the fluid valve until the start of a second, ensuing or following period of time; and
- during the blackout period, the processor restricts, prevents, or stops fluid flowing through the fluid valve regardless of other programming of the irrigation controller.

* * * * *